(12) United States Patent
Ice

(10) Patent No.: US 11,905,129 B2
(45) Date of Patent: *Feb. 20, 2024

(54) SYSTEM AND METHOD FOR SLAT INSTALLATION/REMOVAL

(71) Applicant: Aegis Sortation LLC, Louisville, KY (US)

(72) Inventor: Kenneth Jay Ice, Louisville, KY (US)

(73) Assignee: AEGIS SORTATION, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,304

(22) Filed: Feb. 10, 2023

(65) Prior Publication Data

US 2023/0183024 A1 Jun. 15, 2023

Related U.S. Application Data

(63) Continuation of application No. 16/645,259, filed as application No. PCT/US2018/067375 on Dec. 21, (Continued)

(51) Int. Cl.
*B65G 47/84* (2006.01)
*B65G 43/00* (2006.01)
(Continued)

(52) U.S. Cl.
CPC ......... *B65G 47/844* (2013.01); *B65G 17/066* (2013.01); *B65G 43/00* (2013.01);
(Continued)

(58) Field of Classification Search
CPC .... B65G 47/844; B65G 17/066; B65G 43/00; B65G 2203/046; B65G 2207/36;
(Continued)

(56) References Cited

U.S. PATENT DOCUMENTS 5,967,289 A 10/1999 Kelsey
8,820,520 B2 9/2014 Triesenberg et al.
(Continued)

FOREIGN PATENT DOCUMENTS

EP 0825135 A1 1/1997
JP S56124510 U 9/1981

*Primary Examiner* — Mark A Deuble
(74) *Attorney, Agent, or Firm* — Dickinson Wright PLLC

(57) ABSTRACT

Systems and methods are provided for conveyor operation and maintenance that employ one or both of a "smart shoe" technology where one or more conveyor shoes incorporate features, such as an RFID tag, and a "missing pin detection" technology where one or more pin components of conveyor shoes incorporate features, such as an RFID tag, allowing selective wireless tracking and identification capability. A conveyor system comprises a shoe management system allowing interactions directly with one or more RFID readers, which can detect, store and/or monitor information associated with "smart shoe" and/or "missing pin detection" RFID tags, where interface between this application and the reader can be implemented via a socket interface. System and method also or optionally provide for unique slat installation and removal.

6 Claims, 19 Drawing Sheets

Related U.S. Application Data 2020, now Pat. No. 11,597,609, which is a continuation-in-part of application No. PCT/US2018/066877, filed on Dec. 20, 2018, which is a continuation-in-part of application No. PCT/US2018/050025, filed on Sep. 7, 2018.

(60) Provisional application No. 62/555,061, filed on Sep. 7, 2017.

(51) Int. Cl.
*B65G 17/06* (2006.01)
*H04W 4/80* (2018.01)

(52) U.S. Cl.
CPC .... *B65G 2203/046* (2013.01); *B65G 2207/36* (2013.01); *B65G 2812/02336* (2013.01); *B65G 2812/02396* (2013.01); *H04W 4/80* (2018.02)

(58) Field of Classification Search
CPC ........... B65G 2812/02336; B65G 2812/02396; H04W 4/80
See application file for complete search history.

(56) References Cited

U.S. PATENT DOCUMENTS

| | | |
|---|---|---|
| 11,597,609 B2 * | 3/2023 | Ice .................. B65G 43/00 |
| 2005/0011725 A1 | 1/2005 | Lapeyre et al. |
| 2007/0215436 A1 | 9/2007 | Enomoto |
| 2009/0032374 A1 | 2/2009 | Heit et al. |
| 2009/0250319 A1 | 10/2009 | Bonnain |
| 2011/0233033 A1 | 9/2011 | Poels et al. |

\* cited by examiner

SYSTEM AND METHOD FOR SLAT INSTALLATION/REMOVAL

CROSS-REFERENCE TO RELATED APPLICATIONS

This application is a continuation of U.S. patent application Ser. No. 16/645,259 filed Mar. 6, 2020, which is a National Stage entry of PCT/US2018/067375, filed Dec. 21, 2018, which is a continuation-in-part application of PCT/US2018/066877 filed Dec. 20, 2018, which is a continuation in part of PCT/US2018/050025 filed Sep. 7, 2018, which claim priority to prior U.S. Provisional Patent Application No. 62/555,061, filed Sep. 7, 2017, the entire contents of all of which are incorporated herein by reference.

BACKGROUND

1. Field of Disclosure

Generally, exemplary embodiments of the present disclosure relate to the field of conveyors and conveyor operation, and more particularly sortation conveyor systems including sliding shoe sorters. Exemplary embodiments of the present disclosure provide system and method for sorter slat installation and removal. Exemplary implementations of certain embodiments of the present disclosure provide a system and method allowing missing shoe and/or missing pin detection, identification and/or correction during conveyor operation that may lead to slat installation and/or removal.

2. Background of Disclosure

Conventionally, packages are placed upon a sorter and they ride on the sorter slats. Shoes slide across the slats to remove the package from the sorter it was originally placed upon and divert the package to a specific, new destination.

During operation of sliding shoe sorters deployed in conventional conveyor systems (such as those including a conveyor 300 generally illustrated in FIG. 3), conveyor shoes (such as shoes 400 generally illustrated in FIG. 4), may become dislodged from the conveyor and timely detection of such an occurrence can be challenging, resulting in mishandling of packages, and in some cases breakdowns, halting operation for significant amount of time.

Additionally, shoe sorters conventionally deployed in conveyor systems have a pin and roller arrangement, as generally illustrated in FIG. 19, where bottom of shoe 10 comprises a housing 12 mounted to slat 14 with pin components including roller 16 and pin 18 connected to slat 14 via a mounting bracket 11. During operation, pin components may become dislodged from the show resulting in a missing pin failure and timely detection of the missing pin occurrence is yet another challenge in the field of conveyors and conveyor operation.

If a shoe goes missing or a pin is missing a slat would need to be removed in order to install a new shoe/pin on the slat, and then installed back on the slat. Industry downtime for such removal/installation is very costly.

SUMMARY

Exemplary embodiments of the present disclosure address at least such drawbacks by providing systems and methods that employ a "smart shoe" technology and/or "missing pin detection" technology, where one or more shoes selectively incorporate one or more features allowing selective wireless tracking and identification capability, and systems and methods that employ unique slat installation and removal features and techniques, and provide at least the advantages described below.

According to one aspect of the present disclosure there is provided a conveyor shoe that includes: a housing; a circuit including a radio frequency transceiver transmitting information uniquely associated with the shoe; and a mechanism securing the circuit with respect to the housing.

According to an exemplary implementation, the circuit including a radio frequency transceiver transmitting information uniquely associated with the shoe comprises radio frequency identification (RFID) tag.

According to another aspect of the present disclosure there is provided a conveyor shoe with a pin component that includes: a pin and a roller; another circuit including a radio frequency transceiver transmitting information uniquely associated with the pin component and/or the shoe; and another mechanism securing the other circuit with respect to the pin component.

According to an exemplary implementation, the other circuit including a radio frequency transceiver transmitting information uniquely associated with the pin component and/or the shoe comprises another radio frequency identification (RFID) tag.

According to yet another aspect of the present disclosure there is provided a conveyor shoe that includes: a housing; a circuit including a radio frequency transceiver transmitting information uniquely associated with the shoe; a mechanism securing the circuit with respect to the housing; a pin component that includes a pin and a roller; another circuit including a radio frequency transceiver transmitting information uniquely associated with the pin component and/or the shoe; and another mechanism securing the other circuit with respect to the pin component.

Optionally, in any of the preceding aspects the mechanism securing the circuit with respect to the housing provides secure attachment of the circuit with respect to the housing to maintain the attachment during operation of the shoe.

Optionally, in any of the preceding aspects the other mechanism securing the other circuit with respect to the pin component provides secure attachment of the other circuit with respect to the pin component to maintain the attachment during operation of the shoe.

Optionally, in any of the preceding aspects the mechanism securing the circuit with respect to the housing comprises a cavity within said housing removably securing the RFID tag therein.

Optionally, in any of the preceding aspects the other mechanism securing the other circuit with respect to the pin component comprises a roller cover or a hubcap, including a cavity within the cover removably securing the other RFID tag therein.

Optionally, in any of the preceding aspects the RFID tag and/or the other RFID tag selectively establishes communication with one or more RFID readers providing the RFID reader information uniquely associated with the shoe and/or the pin component.

According to another aspect of the present disclosure there is provided a system that includes: a conveyor; at least one conveyor shoe comprising one or more, in any combination, of the preceding aspects; and at least one reader selectively establishing communication with at least one of the circuits of the at least one shoe.

According to an exemplary implementation, the system can further include a user interface in wired or wireless communication with the at least one reader selectively receiving, processing, storing, and/or displaying the information uniquely associated with the at least one conveyor shoe and/or the at least one pin component.

Optionally, in any of the preceding aspects, the system includes a plurality of the conveyor shoes each including the circuit transmitting information uniquely associated with the conveyor shoe and/or the other circuit transmitting information uniquely associated with the pin component.

Optionally, in any of the preceding aspects, the system including a user interface can be configured such that the user interface selectively controls operation of the conveyor based on the information uniquely associated with at least one of the plurality of conveyor shoes and/or pin components.

According to another aspect of the present disclosure there is provided a method including: deploying on a conveyor at least one conveyor shoe comprising one or more, in any combination, of the preceding aspects; and selectively establishing communication between at least one reader and the circuit of at least one conveyor shoe and/or the other circuit of the pin component.

According to an exemplary implementation, the method can further include selectively establishing wired or wireless communication between a user interface and at least one reader; and selectively receiving, processing, storing, and/or displaying said information uniquely associated with at least one conveyor shoe and/or at least one pin component via the user interface.

Optionally, in any of the preceding aspects, the method includes deploying on the conveyor a plurality of conveyor shoes each including the circuit and/or the other circuit transmitting information uniquely associated with the conveyor shoe and/or the pin component.

Optionally, in any of the preceding aspects, the method includes selectively controlling operation of the conveyor via a user interface based on the information uniquely associated with at least one of the plurality of conveyor shoes and/or the pin components.

Optionally, in any of the preceding aspects, the method includes autonomously controlling operation of the conveyor, for example via a user interface, based on the information uniquely associated with at least one of the plurality of conveyor shoes and/or the pin components.

According to yet another aspect of the present disclosure there is provided a system and method for installation and removal of sorter slats that includes a latching mechanism for securing and releasing a slat from a sorter by operation of an accessible latch controller associated with the slat.

Optionally, conveyor system and/or conveyor shoe and/or any methodology for operation and/or maintenance thereof can includes features according to any of the preceding aspects including "smart shoe" technology and/or "missing pin detection" technology and/or system and method for installation and removal of sorter slats.

BRIEF DESCRIPTION OF THE DRAWINGS

The above and other objects, advantages and salient features of the disclosure will become apparent to those skilled in the art from the following detailed description of illustrative embodiments thereof when taken in conjunction with the accompanying drawings in which.

DETAILED DESCRIPTION OF ILLUSTRATIVE EMBODIMENTS

The matters exemplified in this description are provided to assist in a comprehensive understanding of exemplary embodiments of the disclosure. Accordingly, those of ordinary skill in the art will recognize that various changes and modifications of the embodiments described herein can be made without departing from the scope and spirit of the disclosed embodiments. Also, descriptions of well-known functions and constructions are omitted for clarity and conciseness An exemplary embodiment of the present disclosure employing "smart shoe" technology provides at least one shoe including a radio frequency identification (RFID) tag allowing the at least one shoe to be uniquely identified by a reader, which can be an RFID reader capable of communicating with the RFID tag.

Another exemplary embodiment of the present disclosure employing "missing pin detection" technology provides at least one shoe including pin component with an RFID tag allowing the pin component to be uniquely identified by a reader, which can be an RFID reader capable of communicating with the RFID tag.

Yet another exemplary embodiment of the present disclosure employing "smart shoe" technology and "missing pin detection" technology provides at least one shoe including a pin component with an RFID tag disposed with respect to the shoe housing and another RFID tag disposed with respect to the pin component, allowing the at least one shoe and/or the pin component to be uniquely identified by a reader, which can be an RFID reader capable of communicating, or selectively communicating, with at least one of the RFID tags.

Further exemplary embodiment of the present disclosure employing "smart shoe" technology and/or "missing pin detection" technology provides a conveyor system including a plurality of, or all, shoes each including an RFID tag disposed with respect to the shoe housing and/or another RFID tag disposed with respect to the pin component, allowing each of the shoes and/or pin components to be uniquely identified and monitored by at least one reader deployed by the conveyor system to provide real time and/or historical data indicative of the operation of each shoe, pin component, and/or the conveyor system.

Yet further exemplary embodiment of the present disclosure employing "smart shoe" technology and/or "missing pin detection" technology provides a conveyor system including a plurality of, or all, shoes each including an RFID tag disposed with respect to the shoe housing and/or another RFID tag disposed with respect to the pin component, allowing each of the shoes and/or pin components to be uniquely identified by at least one reader deployed by the conveyor system, whereby operation of the conveyor system can be controlled by a user, our autonomously controlled, based on real time and/or historical data indicative of the operation of each shoe, pin component, and/or the conveyor system provided by the reader(s).

Figure 1:
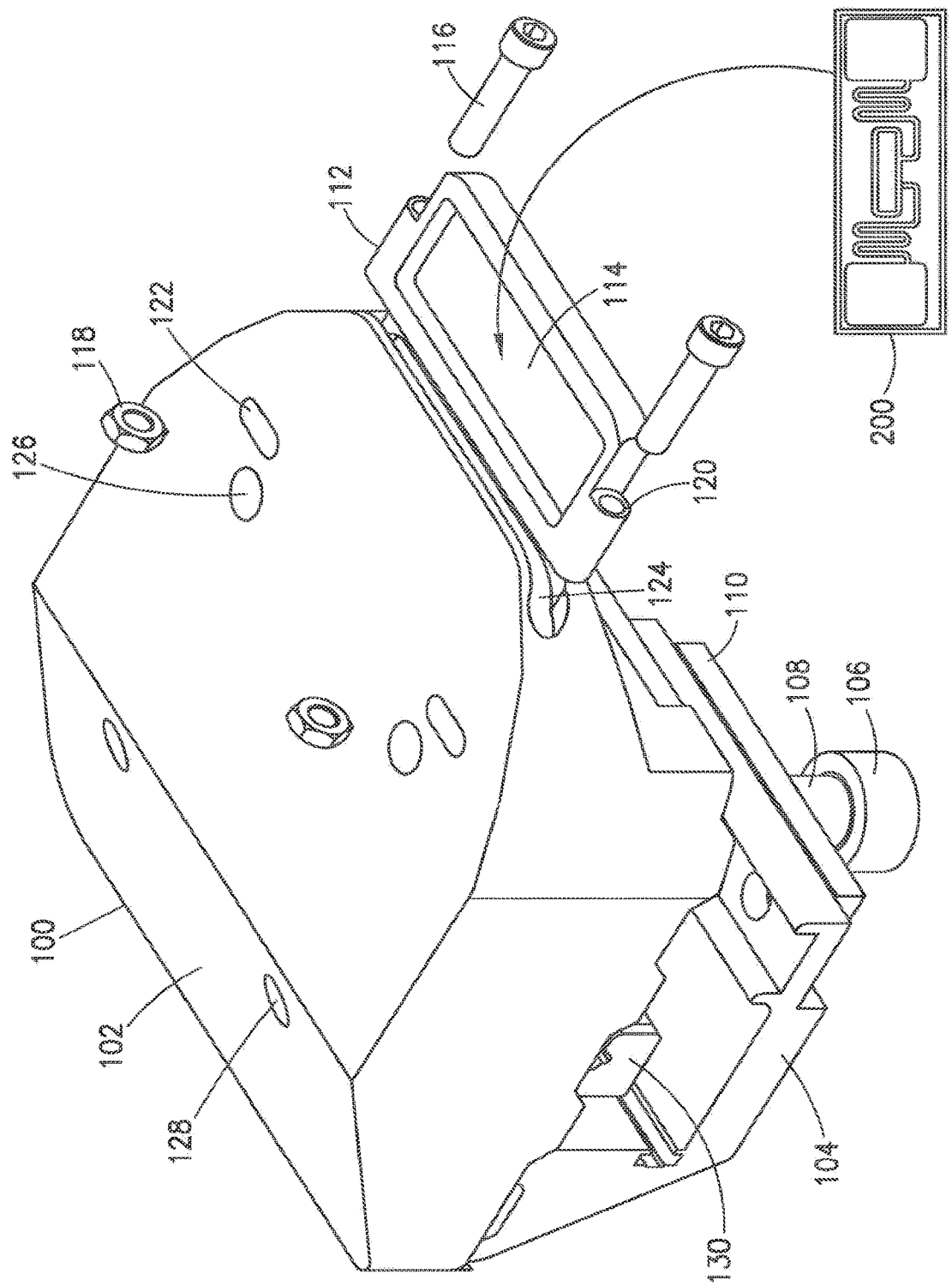
FIG. 1 illustrates an example of a conveyor shoe according to embodiments of present disclosure.
Figure 2:
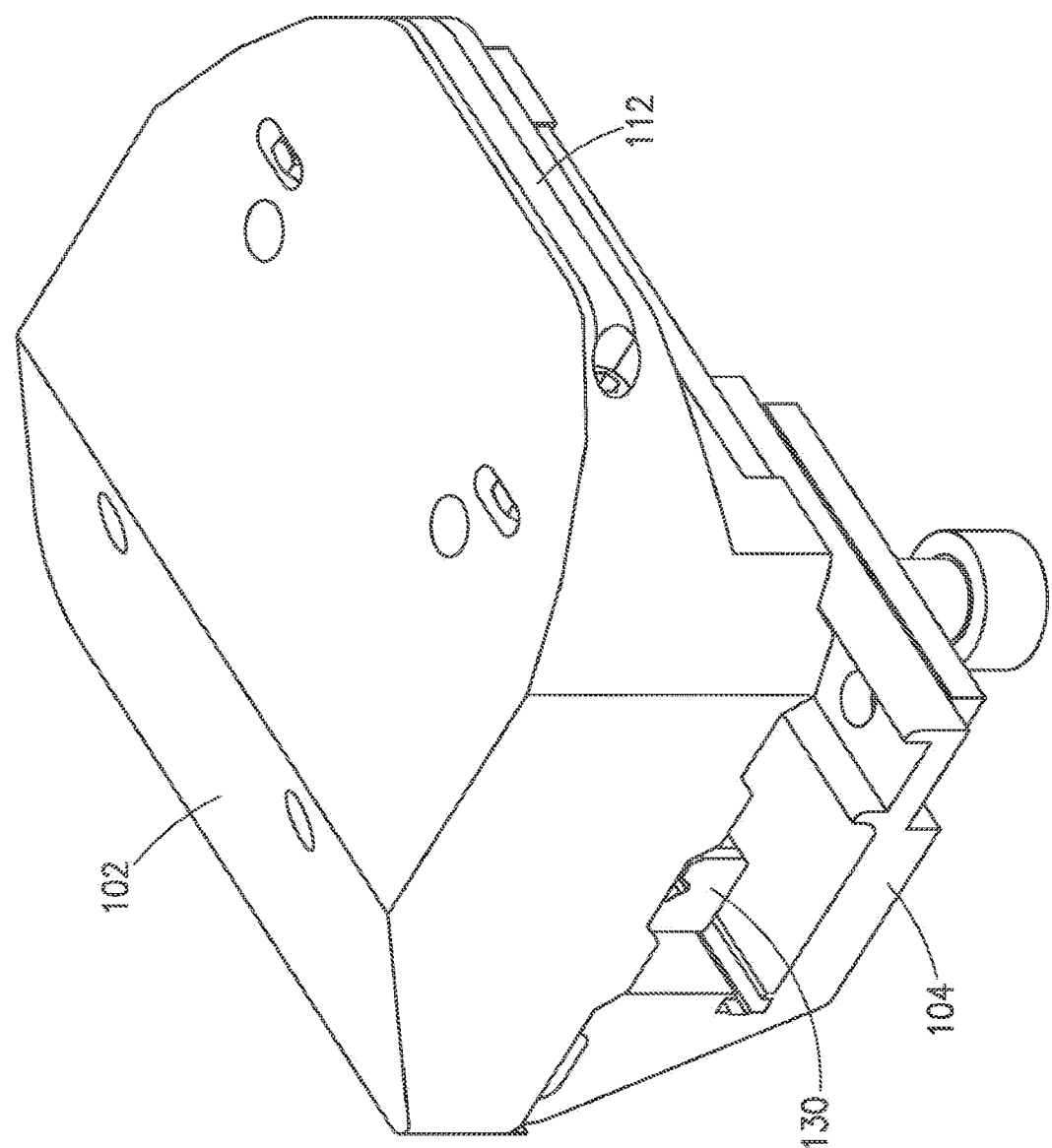
FIG. 2 illustrates an example of another view of a conveyor shoe according to embodiments of present disclosure.
Figure 3:
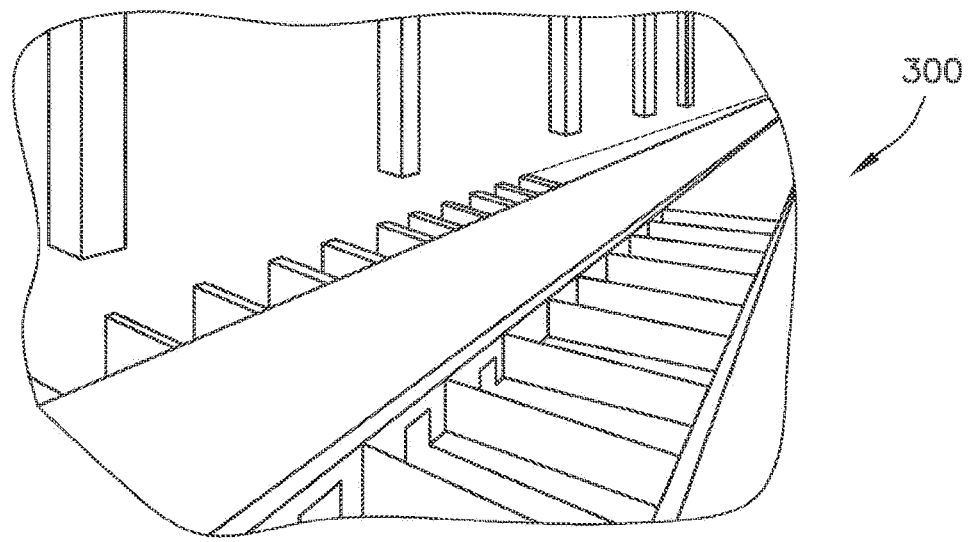
FIG. 3 illustrates an example of a conventional conveyor.
Figure 4:
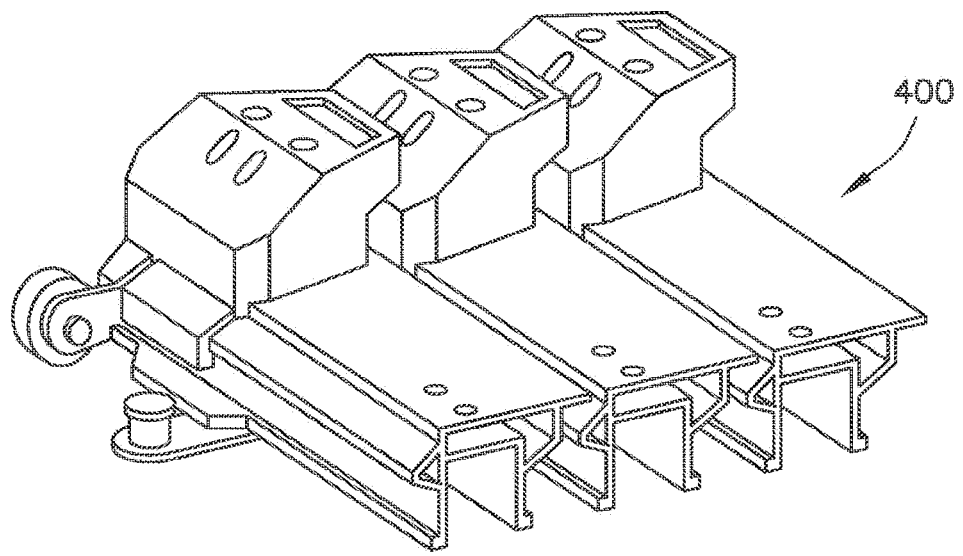
FIG. 4 illustrates an example of conventional conveyor shoes.

In a non-limiting exemplary implementation of exemplary embodiments of the present disclosure, diagrammatically shown in the examples of FIGS. 1 and 2, a smart shoe 100 disposed on a sliding assembly 130 comprises a housing 102 including an RFID tag 200 therein. As illustrated, housing 102 can include a slot or compartment 124 for accommodating a tray 112 for an RFID tag 200 such that, once RFID tag 200 is placed in the tray 112, the tray 112 can be secured in the slot or compartment 124, for example by means of one or more screws 116 and nuts 118 attaching one or more portions 120 of tray 112 to housing 102. In yet further exemplary implementation, housing 102 includes one or more mounting areas, such as holes 126, 128, for mounting housing 102 to slat 104. Pin components 106, 108 are connected to slat 104 via a mounting bracket 110.

While a detailed implementation is described with reference to FIGS. 1 and 2, any means of attaching or incorporating an RFID tag in or on a shoe of a conveyor system is within the scope of the present disclosure.

Figure 20:
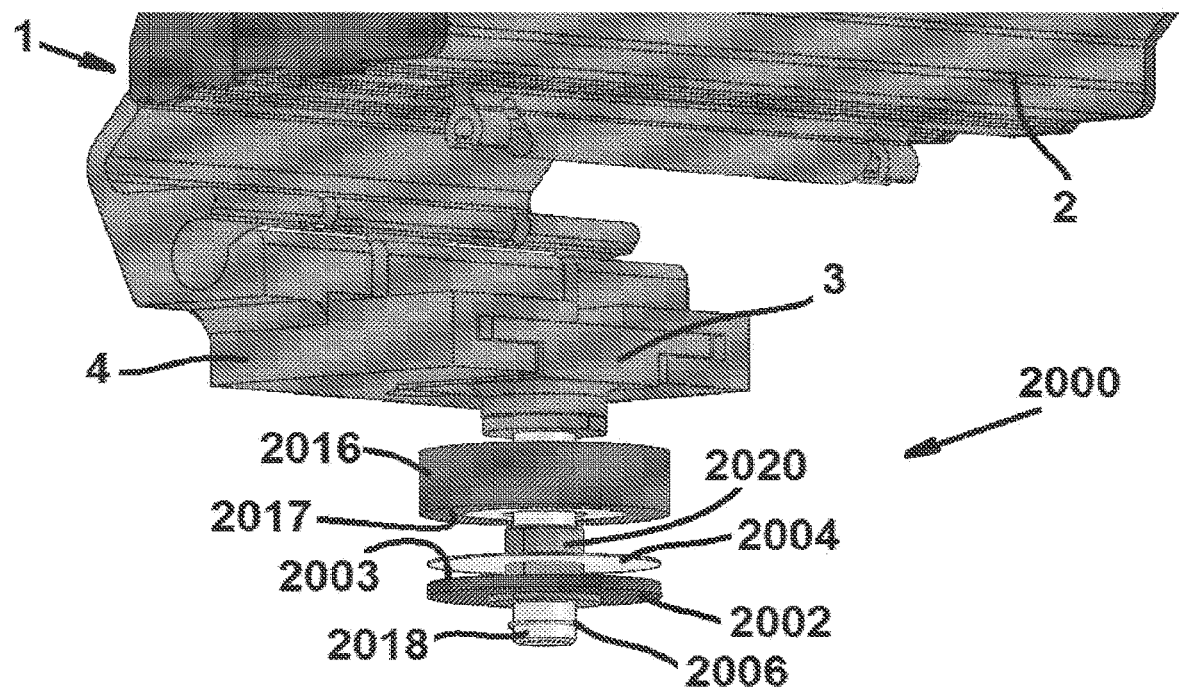
FIG. 20 illustrates an example of a conveyor shoe including a pin component according to embodiments of present disclosure.
Figure 21:
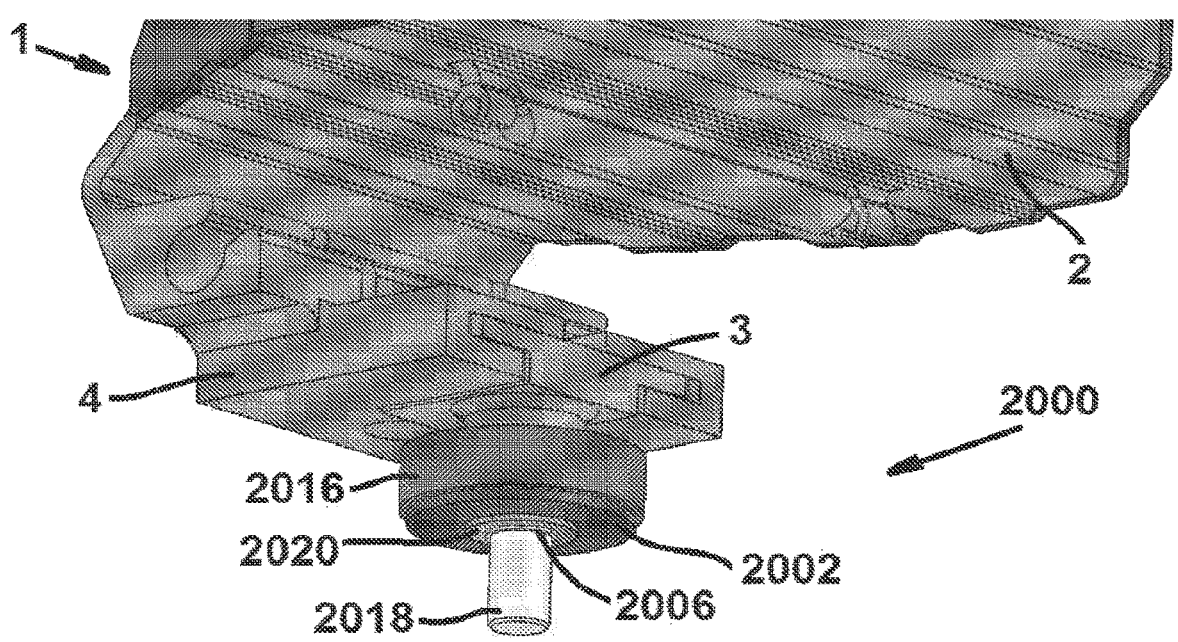
FIG. 21 illustrates an example of another view of a conveyor shoe including a pin component according to embodiments of present disclosure.
Figure 22:
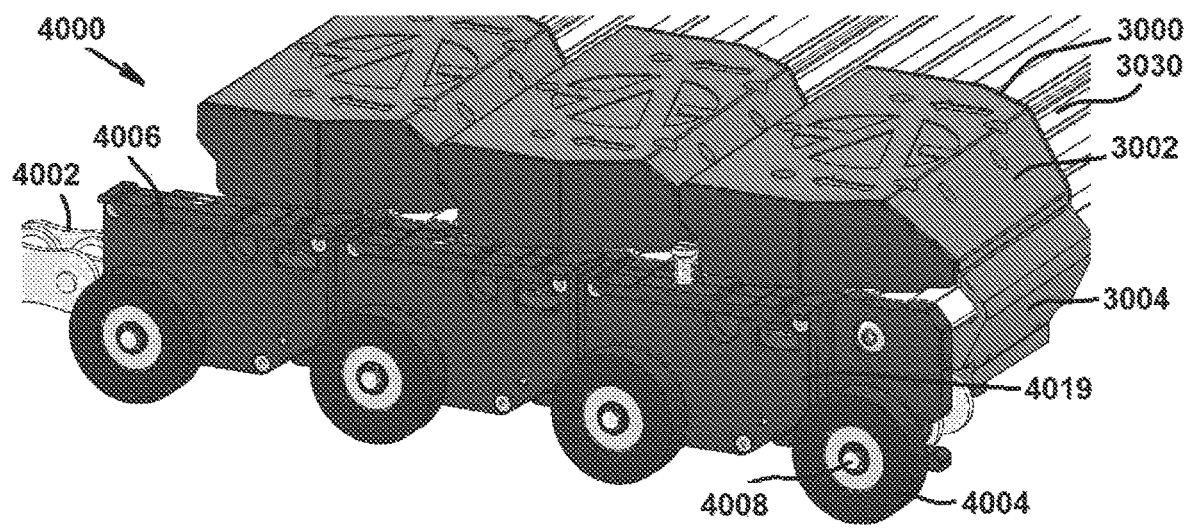
FIG. 22 is a diagrammatic illustration of a conveyor or sorter including exemplary implementations of embodiments of the present disclosure.
Figure 23:
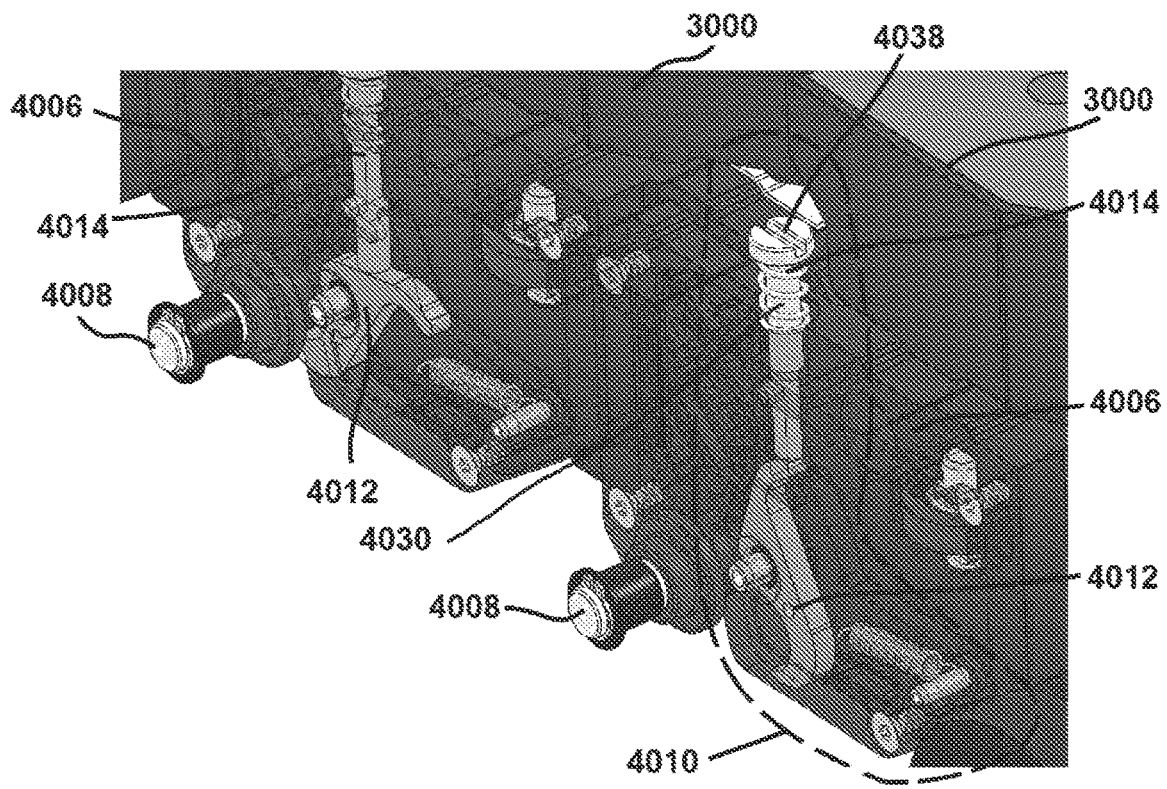
FIG. 23 is a diagrammatic illustration of a system and method for removal and installation of sorter slats according to exemplary embodiments of the present disclosure.
Figure 24:
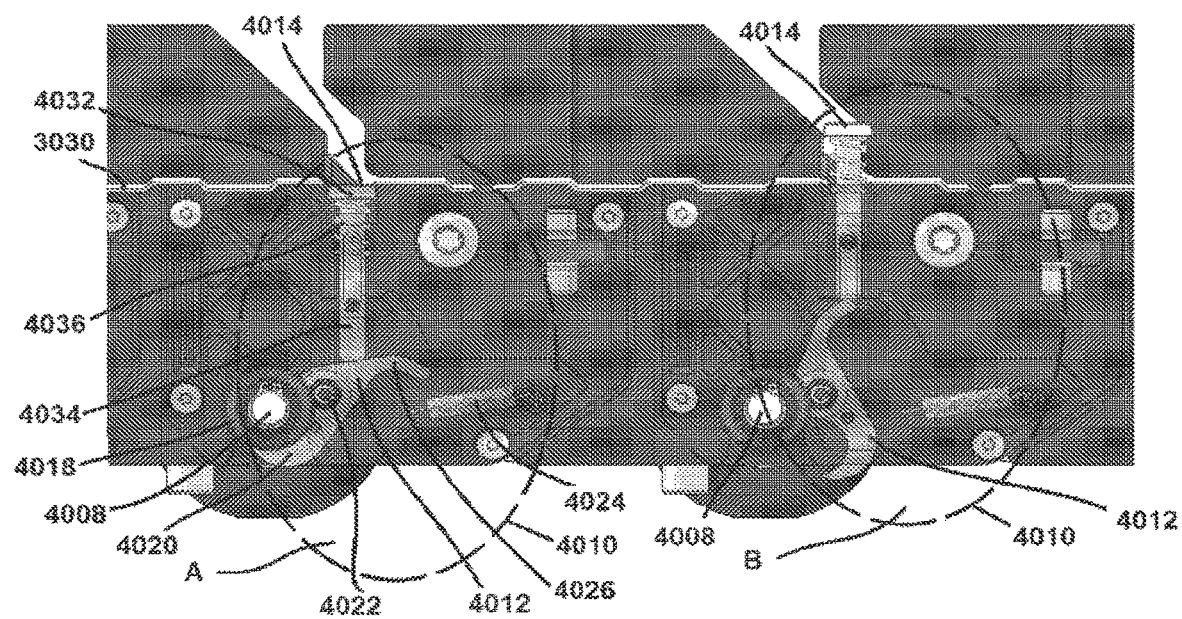
FIG. 24 illustrates an example of another view, a side view, of a conveyor or sorter including a system and method for removal and installation of sorter slats according to exemplary embodiments of the present disclosure.
Figure 25:
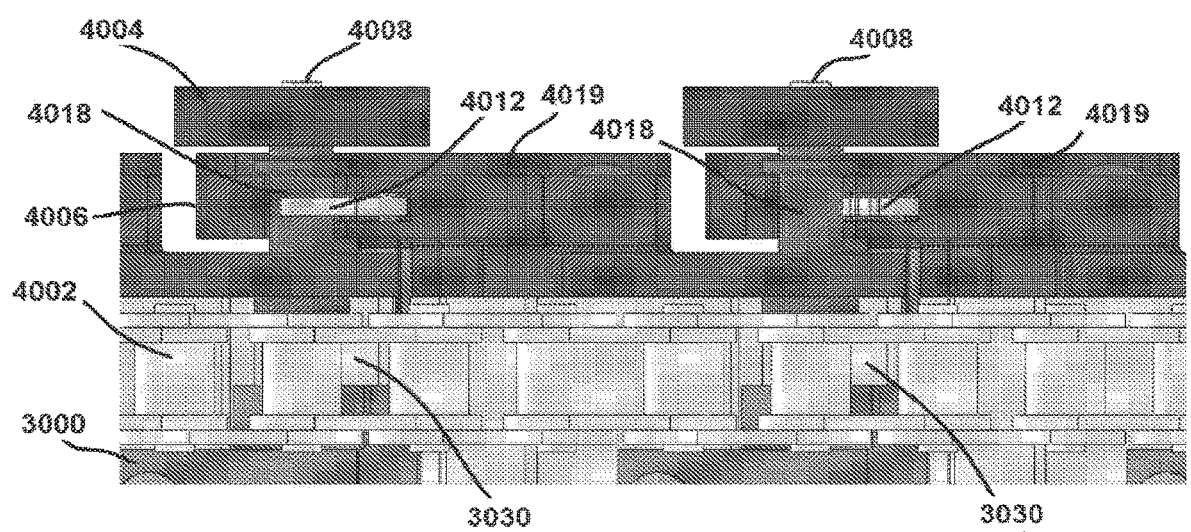
FIG. 25 illustrates an example of another view, a bottom view, of a conveyor or sorter including a system and method for removal and installation of sorter slats according to exemplary embodiments of the present disclosure.
Figure 26:
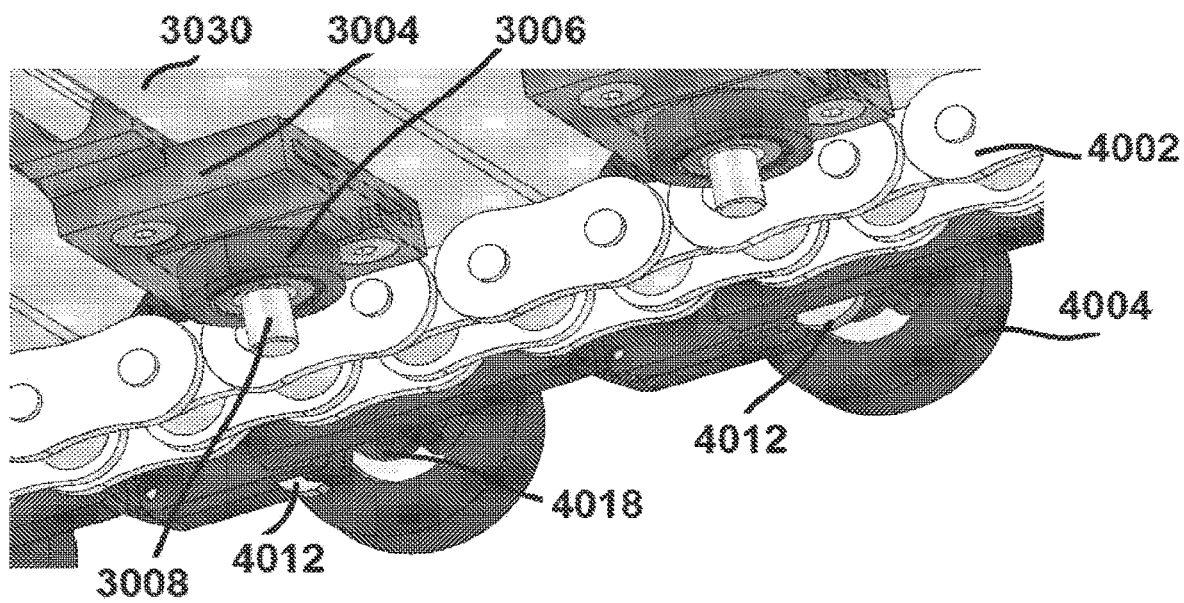
FIG. 26 illustrates an example of another view, a bottom perspective view, of a conveyor or sorter including a system and method for removal and installation of sorter slats according to exemplary embodiments of the present disclosure.

In another non-limiting exemplary implementation of exemplary embodiments of the present disclosure, diagrammatically shown in the examples of FIGS. 20 and 21, a conventional shoe, or a smart shoe 100 comprising a housing 102 including an RFID tag 200 therein, comprises a pin component 2000 associated with shoe 1, for example where housing 2 of shoe 1 is mounted to slat 4 and pin component 2000 is connected to slat 4 via a mounting bracket 3. As illustrated, component 2000 includes roller 2016 rotatably disposed on pin 2018, and further includes a cover, or hubcap, 2002 for accommodating an RFID tag 2004 such that, once RFID tag 2004 is placed in or on cover 2002, the cover 2002 can be removably or permanently fixed with respect to roller 2016 such that RFID tag 2004 is secured within the cover 2002 and between inner surface 2003 of cover 2002 and outer surface 2017 of roller 2016 as illustrated in FIG. 21. An interface 2020 can also be provided to rotationally fix cover 2002 either with respect to pin 2018 or with respect to roller 2016, such that the roller 2016 can rotate either with respect to interface 2020 fixed to pin 2018, or with interface 2020 with respect to pin 2018.

In an exemplary implementation, cover 2002 can be removably or permanently fixed to roller 2016, for example by means of one or more pressure bands 2006 configured with respect to pin 2018. In another exemplary implementation, pin 2018 can include at least a partial thread such that a band/or nut 2006 having internal threading can secure cover 2006 with respect to roller 2016. In yet another exemplary implementation, band 2006 can be snap fit to a portion of pin 2018 to secure cover 2006 with respect to roller 2016. In a further exemplary implementation, cover 2006 can be secured with respect to roller 2016 by means of interface 2020, with or without the use of band 2006.

In yet further exemplary implementation, illustrated in FIG. 20, element 2004 can be an intermediate cover or a sealing element placed over an RFID tag (not shown) which is disposed within the cover, or hubcap, 2002. In still further exemplary implementation, cover 2002, interface 2020, element 2004 with RFID tag (not shown within cover 2002 under element 2004) can be assembled as a unit mounted on pin 2018 with respect to roller 2016, as illustrated in FIG. 21. For example, such an assembled unit can be rotationally fixed or not fixed to pin 2018 and/or roller 2016, with or without the use of band 2006, as long as roller 2016 can rotate with respect to pin 2018.

While a detailed implementation is described with reference to FIGS. 20 and 21, any means of attaching or incorporating an RFID tag in or on a pin component of a shoe of a conveyor system is within the scope of the present disclosure.

Another exemplary embodiment of the present disclosure provides a conveyor system including one or more shoes, preferably all shoes, having an RFID tag associated therewith, for example as described above with reference to FIGS. 1 and 2, and/or an RFID tag associated with a pin component thereof, for example as described above with reference to FIGS. 20 and 21, and at least one RFID tag reader. According to an exemplary implementation, a conveyor system comprises a shoe management system allowing customer interactions directly with the reader where, for example, interface between this application and the reader can be implemented via a socket interface. In a further exemplary implementation, an OPC (open platform communications) wrapper can be created around the interface so that a HMI (Human Machine Interface) could interact directly with the shoe management system.

An exemplary embodiment of the present disclosure provides a system and method for monitoring a conveyor operation deploying shoes with RFID tags, configured for example as described with reference to FIGS. 1 and 2, facilitating accurate detection and identification of a missing shoe such as when a shoe comes off of the conveyor using communication between shoe's RFID tag and at least one RFID reader strategically deployed with respect to the conveyor and/or the shoes, and communication between the at least one reader and a system, such as a portable computer, a hand-held communication device, a server, and Internet-based solution, etc., providing a user interface, and/or a programmable logic controller (PLC). In an exemplary implementation, communication to the PLC can be supported using any available protocols, such as Ethernet Industrial Protocol (EIP) and/or Transmission Control Protocol/Internet Protocol (TCP/IP) adaptable to the hardware of RFID reader.

An exemplary embodiment of the present disclosure provides a system and method for monitoring a conveyor operation deploying shoes with RFID tags, configured as described above with reference to FIGS. 20 and 21, facilitating accurate detection and identification of a missing pin and/or shoe with a missing and/or malfunctioning pin using communication between pin component's RFID tag and at least one RFID reader strategically deployed with respect to the conveyor and/or the shoes, and communication between the at least one reader and a system, such as a portable computer, a hand-held communication device, a server, and Internet-based solution, etc., providing a user interface, and/or a programmable logic controller (PLC). In an exemplary implementation, communication to the PLC can be supported using any available protocols, such as Ethernet Industrial Protocol (EIP) and/or Transmission Control Protocol/Internet Protocol (TCP/IP) adaptable to the hardware of RFID reader In an exemplary implementation, system and method according to exemplary embodiments of the present disclosure provide various modes of operation for a conveyor system implementing smart shoe technology and/or missing pin detection technology including without limitation: commissioning and setup mode where at least one reader is determining what RFID tag(s) are in any one or more of the respective shoes and/or pin components; operational mode where a sorter conveyor is running at and operational speed and at least one reader is actively monitoring the status of one or more of RFID tag carrying shoes and /or pin components on the sorter; maintenance mode where a PLC can request to be notified when a particular shoe and/or pin component is at the reader and the reader can respond by sending a shoe status and/or pin component status notification such that the PLC can properly present the shoe and/or pin component in a maintenance area; and/or broken shoe presentation mode where an identified broken shoe can be present to a maintenance area by a sorter; and/or a missing pin component presentation mode.

Exemplary non-limiting implementations of various operation modes provided by the system and methods of the exemplary embodiment of the present disclosure deploying "smart shoe" technology and/or "missing pin detection" technology are described as follows with reference to FIGS. 5-18, where monitoring and deployment of RFID components described with respect to examples of "smart shoe" technology are equally applicable to monitoring and deployment of RFID components of "missing pin detection" technology so that such analogous description (i.e., where a "missing pin" can be analogized to RFID deployment and processing of a "missing shoe") is omitted.

Figure 5:
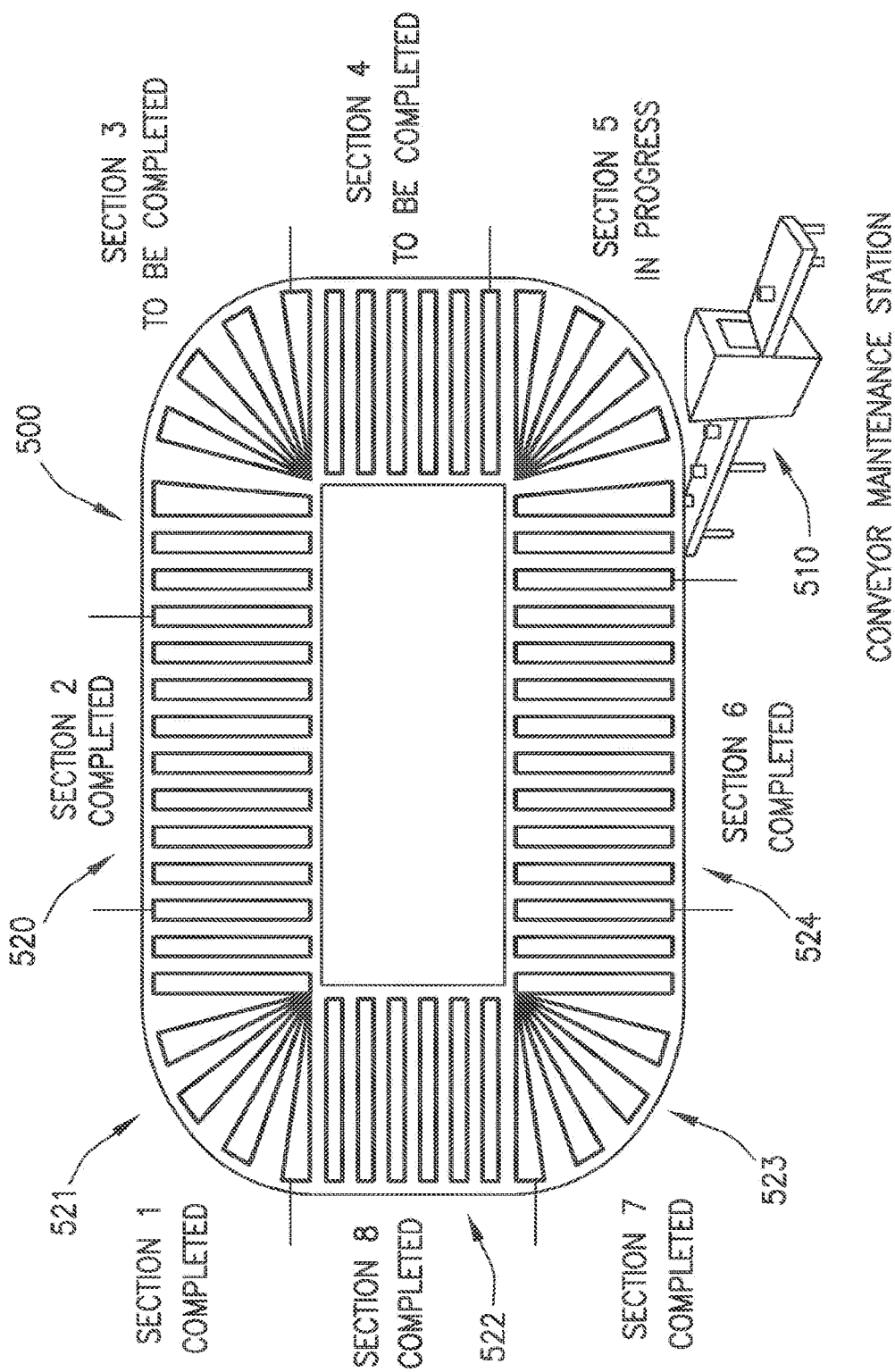
FIG. 5 is a diagrammatic illustration of an example of a system according to embodiments of present disclosure.
Figure 6:
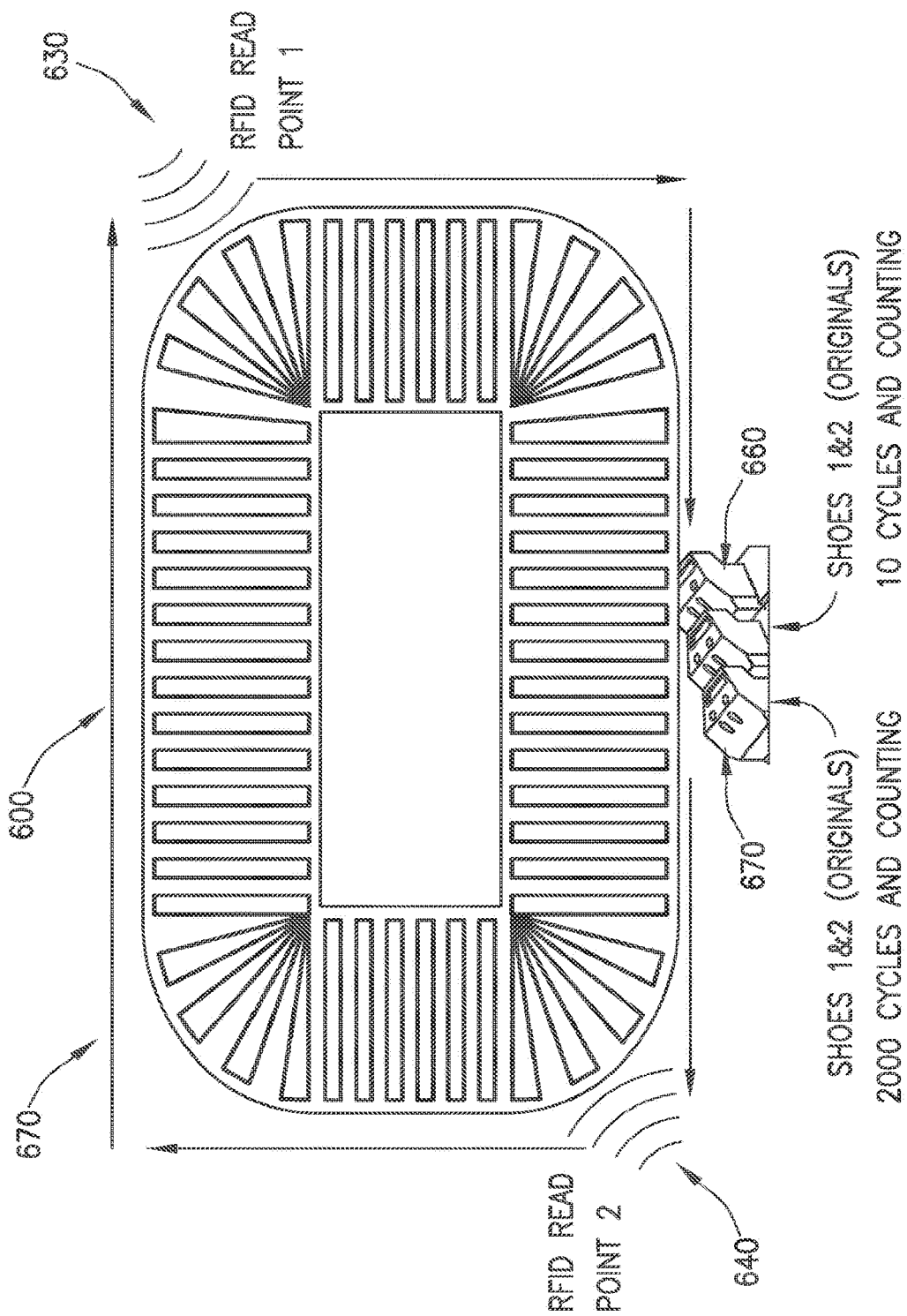
FIG. 6 is another diagrammatic illustration of an example of a system according to embodiments of present disclosure.
Figure 7:
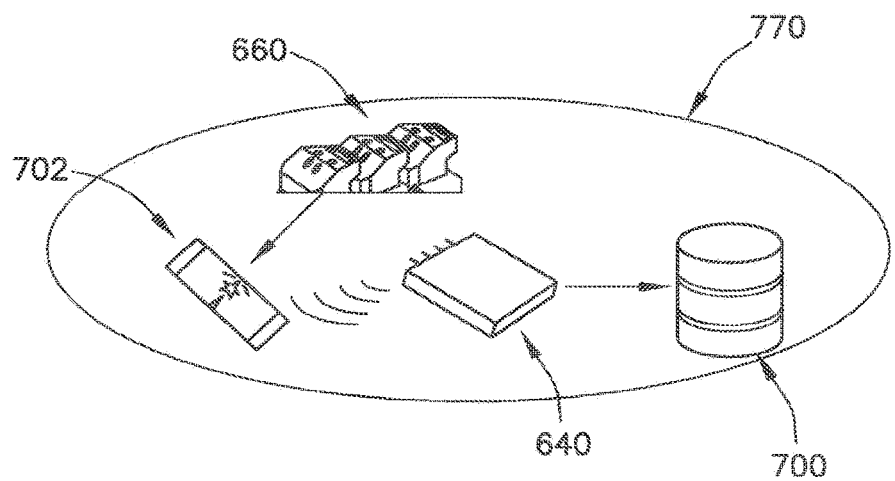
FIG. 7 is a diagrammatic illustration of an example of an operation of a system according to embodiments of present disclosure.
Figure 8:
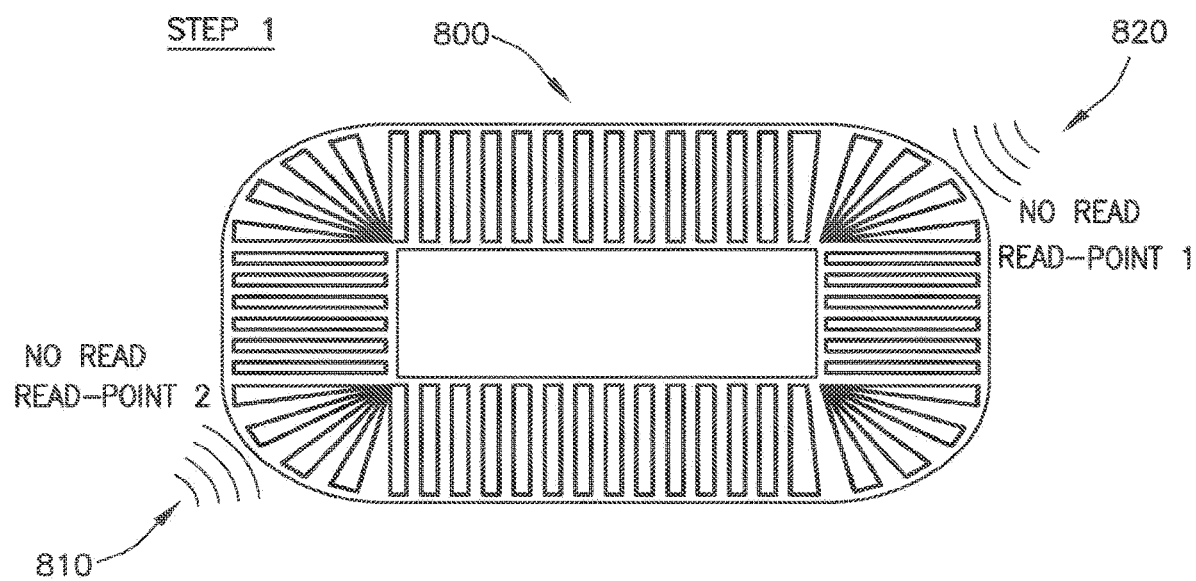
FIGS. 8-11 are diagrammatic illustrations of an example of a method using a system configuration according to embodiments of present disclosure.
Figure 9:
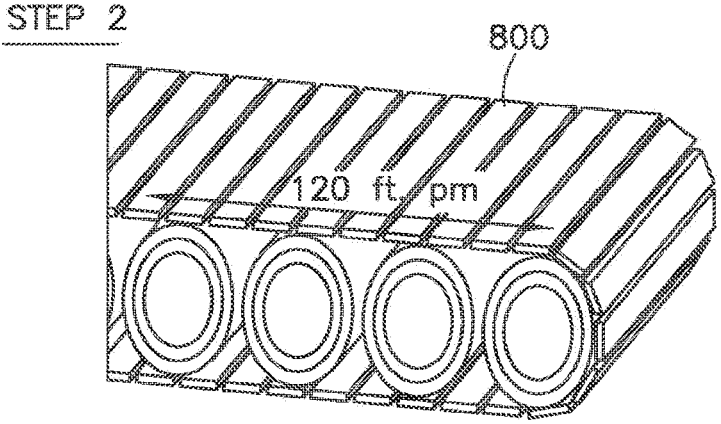
Figure 10:
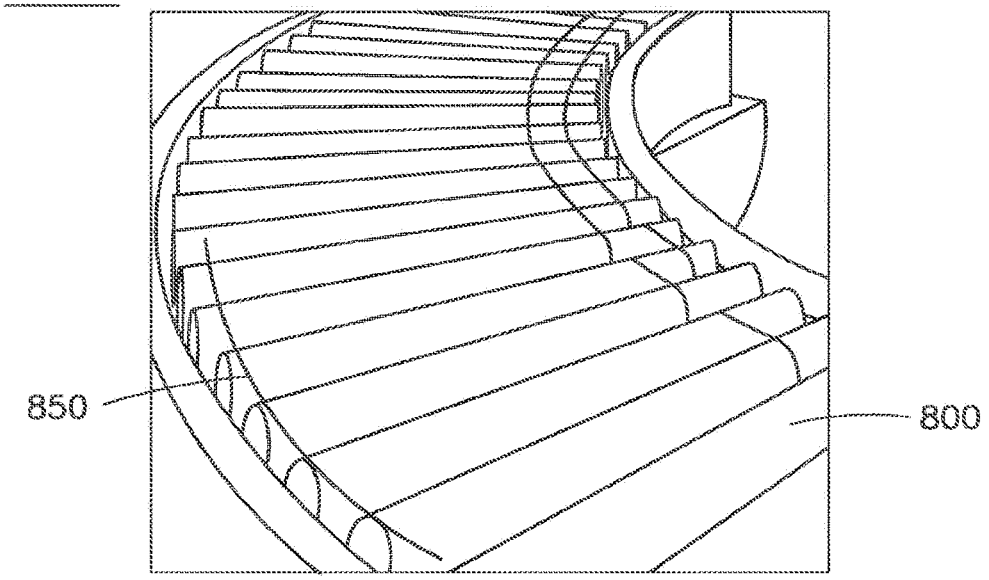
Figure 11:
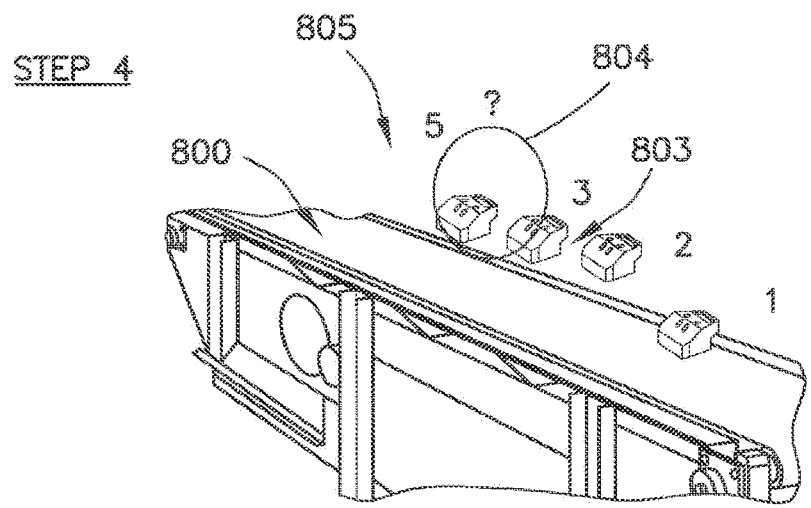

Referring to FIGS. 5-7, according to exemplary implementations, a missing-shoe detection system with an added RFID component optionally can be deployed on an existing conveyor product line to provide, without limitation and in any combination:

Missing Shoe Detection and Correction: During conveyor operation, automatically identifying missing 'sort shoes' on the conveyor 500, and sending a message, for example to a conveyor maintenance station 510, to set the conveyer to "missing-shoe maintenance" mode. From missing-shoe maintenance mode, a series of corrective steps will be followed by the operator to replace that shoe.

Sectional-Identification during 'Non-Shoe Related' Conveyor Maintenance Cycles: Using the RFID tags on the sort-shoes, such as those described above with reference to FIGS. 1 and 2, to identify "already completed" sections 520, 521, 522, 523, 524 of the conveyor 500 during traditional (non-shoe related) conveyor maintenance cycles.

Cycle-Count Record Keeping of Sort-Shoes: For preventative maintenance purposes, the system can keep track of the number of times shoes 650, 660 rotate around the conveyor 600. As individual shoes get replaced during the "missing shoe detection and correction" process those shoes will be decommissioned by the system, while the new (replacement) shoes will be introduced and will begin their own cycle-count records.

Exemplary implementation: If the missing shoe identification and replacement feature is not desired, cycle-count read capability only can be implemented using one RFID read point, which translates to 1 reader×2 antennas.

RFID-System Commissioning and RFID Setup Procedure: Every newly-deployed conveyor 600 can be fitted with sort-shoes that have RFID tags, for example shoe 660 including any combinations of features described above with reference to FIGS. 1 and 2 fitted with a tag 702. When the conveyor-system is initially turned on and/or is put into commissioning or setup mode the RFID reader 630 and/or 640 at one of two designated read points can begin programming these RFID tags one at a time. Once all of the tags have moved through the encoding cycle 670, the RFID-component of the conveyor system can be deemed "ready for use".

Exemplary detailed implementations

The RFID system can encode these tags 702 in numeric-sequential order, and know when the encoding cycle is complete upon reading the first tag it programmed at the onset of this process.

If, during the RFID-tag encoding process a tag is missed (not programmed), this will be detected by the system during an ensuing conveyor-run cycle, and the system will prompt the operator to run the encoding cycle again.

As each shoe-tag is encoded during the setup cycle 770, that tag's RFID EPC number will be logged into a database 700. From that point forward, that shoe will be individually identified by that EPC number.

Referring to FIGS. 8-13, exemplary implementations provide optionally and/or in combination with other features, a Missing Shoe Detection and Cycle Counts as follows. As the conveyor 800 runs, every shoe's RFID tag is recorded as having completed one full cycle each time it passes by the RFID read point. If a particular tag does not pass by the RFID read-point after a given number of cycle runs (i.e., the "number of runs" it takes to determine that a shoe is missing can be set on a situational basis), that tag (i.e., that shoe) is deemed by the system as being missing. Consequently, the system sends an alert and goes into "missing shoe" recovery mode. During Missing Shoe Recovery Mode, the operator can by-pass or accept the alert, and upon accepting the alert the conveyor automatically slows down to ⅕ speed (i.e., down to 120 fpm from 600 fpm) allowing the operator to then search for the missing shoe.

As the operator searches for the missing shoe from atop the conveyors' maintenance station/platform, he puts the conveyor into "jog" mode. The operator has the benefit of knowing precisely where the 'missing-shoe bearing' is on the conveyor and when it will arrive at the maintenance station, as during the RFID setup process all of the RFID tags were sequentially numbered.

Exemplary implementation can be described with reference to FIGS. 8-11 as follows:

Step 1 (FIG. 8): Bearing with missing shoe passes by two read-points 810 and 820, and system deems that shoe as missing.

Step 2 (FIG. 9): Upon operator accepting alert, conveyor slows down, for example to ⅕ speed (120 ft. per minute).

Step 3 (FIG. 10): Upon honing in on "missing shoe bearing" area 850, the operator puts conveyor into "jog" mode to isolate that bearing.

Step 4 (FIG. 11): Operator finds missing-shoe bearing by honing in on RFID tags 805 and 803 that were directly in front of the missing shoe 804.

Figure 12:
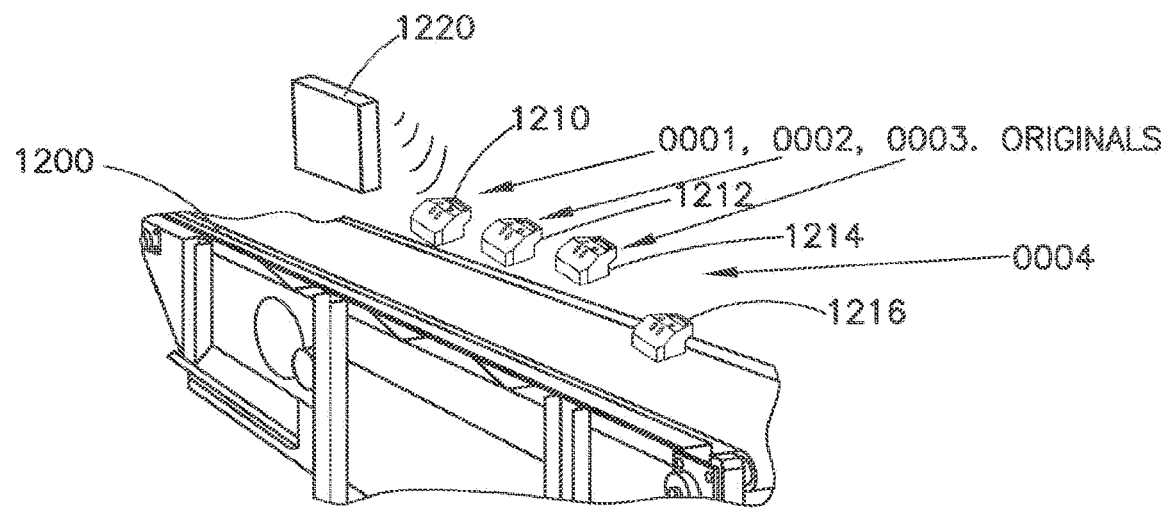
FIG. 12 is a diagrammatic illustration of another example of an operation of a system according to embodiments of present disclosure.

Referring to FIG. 12, an exemplary implementation of Replacement-Tag Encoding includes: after a missing shoe gets physically replaced on the conveyor, it is critical that the RFID tag of replacement shoes 1216 is encoded, for example via reader/encoder 1220 in such a way that that particular shoe is identified by the system in the correct physical sequence. Associated steps are as follows:

a. Shoe 1216 is physically placed on bearing of conveyor 1200
b. Operator puts system into tag re-encoding mode and conveyor begins cycling in search of 'newly replaced' RFID tag. The system knows which tag to re-encode by scanning and identifying the tags of shoes such as 1210, 1212, 1214 directly in front of it on the conveyor 1200. The system also knows what EPC number to encode the replacement-tag with, so that the replacement-tag is always recognized by the system in the correct sequence (for jogging, etc.).
c. Replacement-tag is encoded, with the same EPC number as the original tag it replaced—plus one bit-change at the end of the EPC that identifies that tag as being associated to a "replacement" shoe.

Exemplary implementation: The entre process above can be circumvented at any point in time through a manual-override option on the conveyor console, so that the decision of when to replace the missing shoe can be made by the operator.

Figure 13:
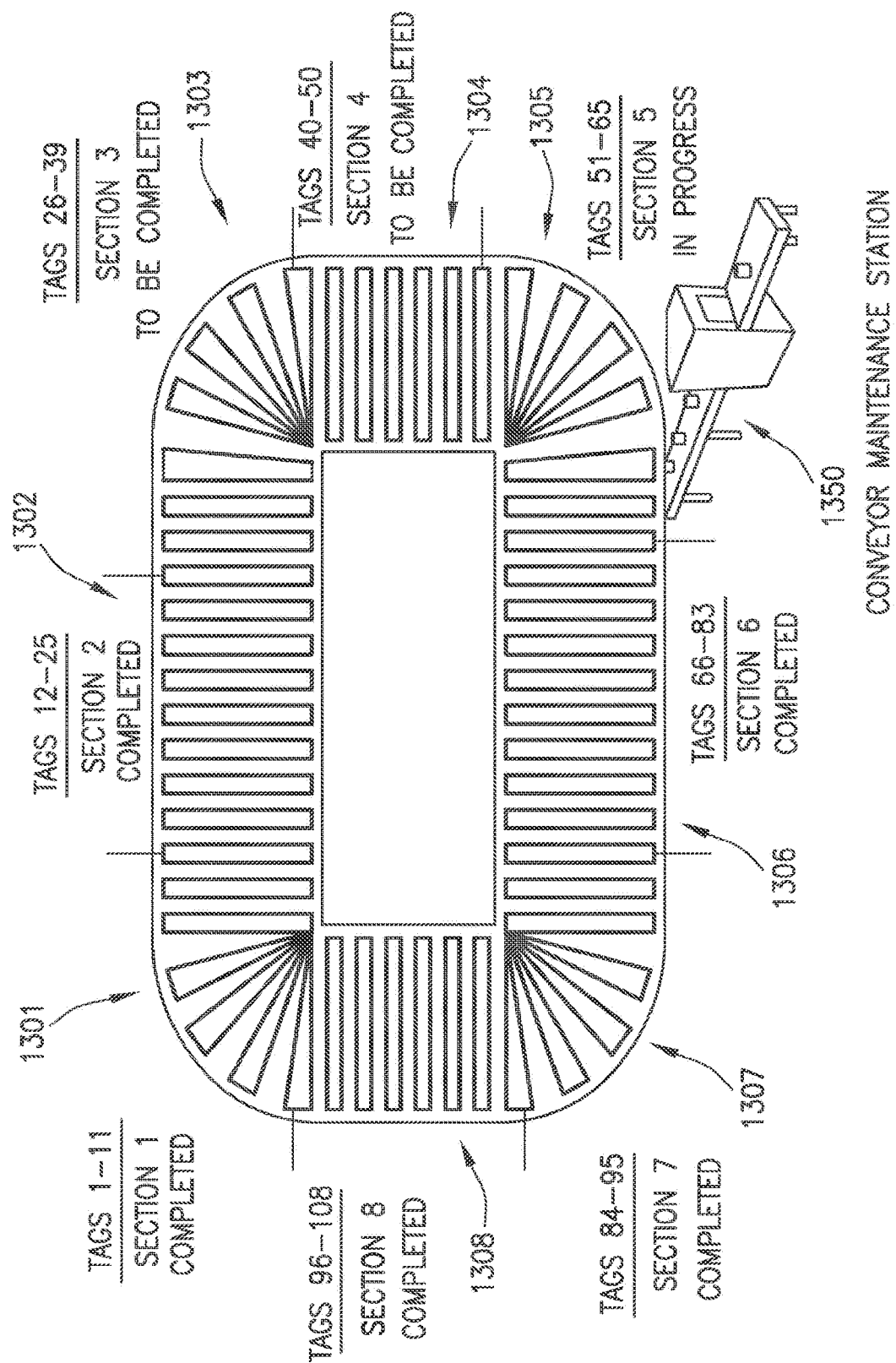
FIG. 13 is a diagrammatic illustration of an example of an operation of a system according to embodiments of present disclosure.

Referring to FIG. 13, exemplary implementations provide a Non-Shoe Related 'Conveyor Maintenance Mode' where for example conveyor 1300 is sectionalized, with each section 1301, 1302, 1302, 1304, 1306, 1307, 1308 being identified by those RFID tags that reside within it. During traditional maintenance cycles (i.e. non-RFID related, incremental conveyor maintenance) the operator (conveyor maintenance station 1350) has the ability to jog the conveyor by individual sections, service those sections, and consequently identify/categorize those sections within the system as either having been completed (for example, section 1301, 1302, 1306, 1307, 1308) for service, in progress (for example, section 1305), or still needing to be serviced (for example, sections 1303 and 1304).

Figure 14:
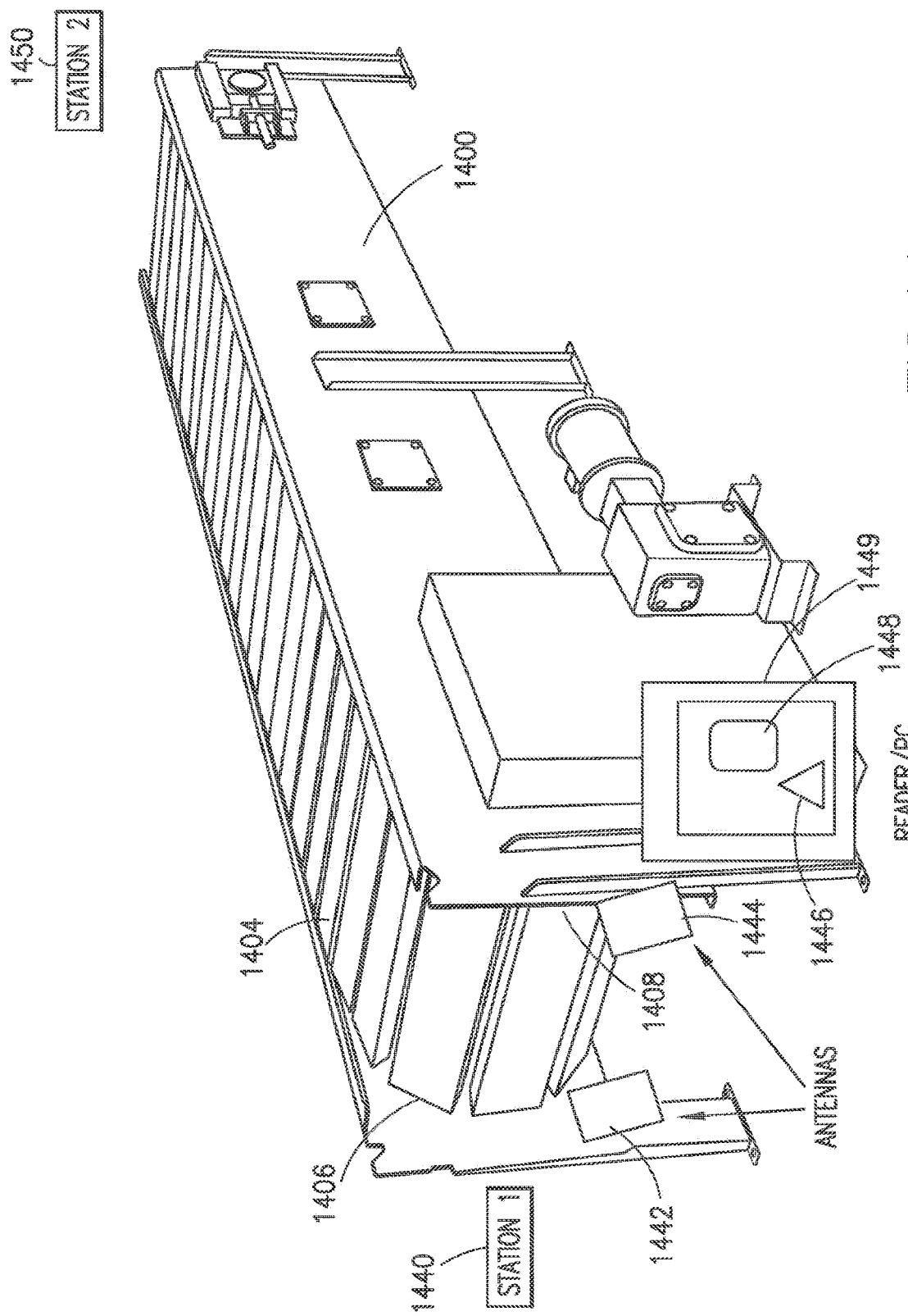
FIG. 14 is another diagrammatic illustration of an example of a system according to embodiments of present disclosure.

Referring to FIG. 14, exemplary implementations provide hardware including, without limitation and in any combination: two RFID read stations 1440, 1450, one at each end of the sortation conveyor 1400. Any station or all stations, such as stations 1440, 1450 can comprise a reader 1446 and for example tow antennas 1442, 1443, covering the left 1406 and right 1408 of the belt 1404 in order to capture shoes that can be either left or right justified. The readers can be inside, for example a NEMA 1 rated, enclosure 1449, and the antennas can be mounted directly underneath the belt 1404. In an exemplary implementation, both stations 1440, 1450 can read tags, but only "Station 1" 1440 can be configured to handle the encoding processes. For example, a PC 1448 can be installed within enclosure 1449 of station 1440, but can connect and communicate with readers in both stations 1440, 1450.

Figure 15:
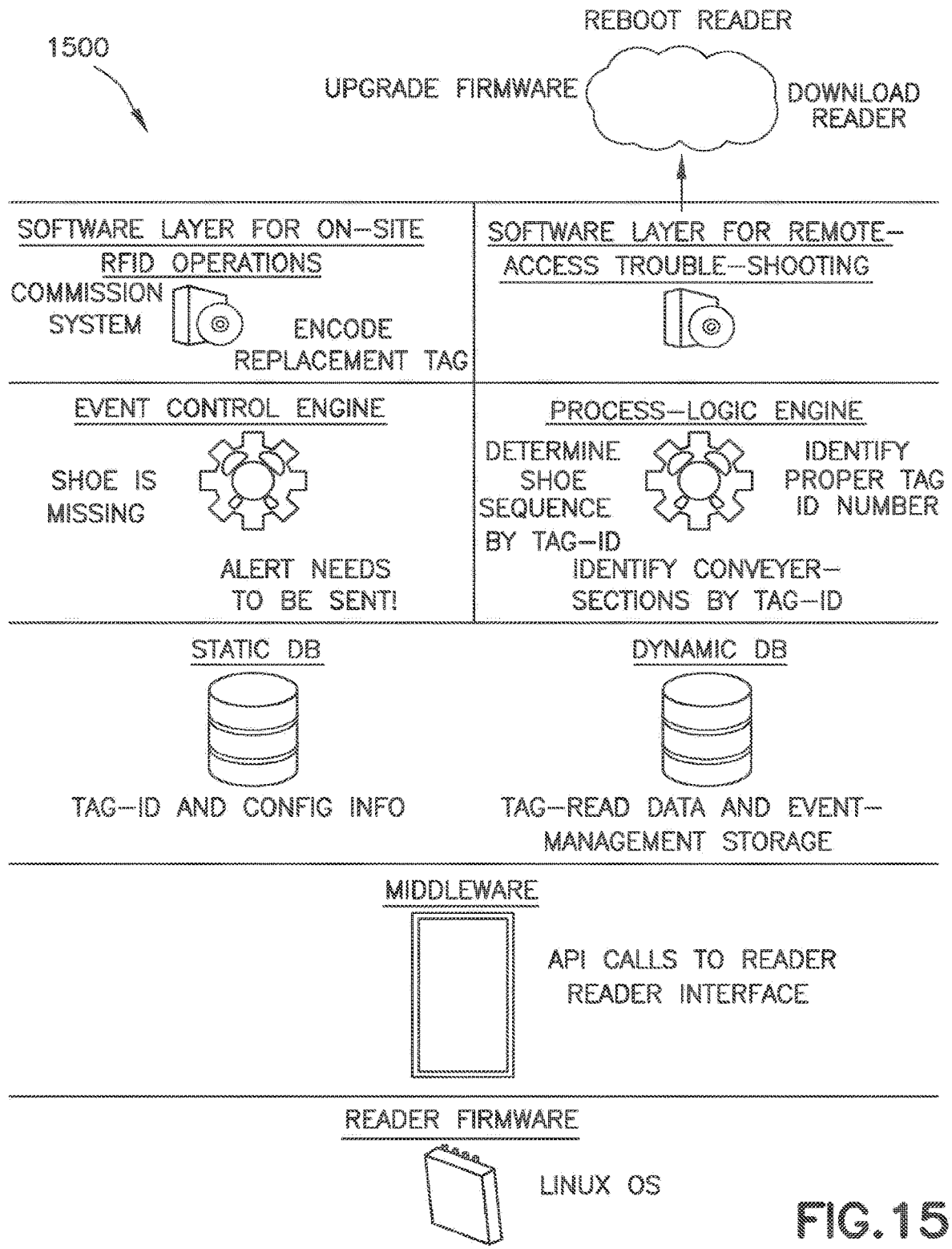
FIG. 15 is a diagrammatic illustration of an example of an operation including software and hardware components of a system according to embodiments of present disclosure.

Referring to FIG. 15, which diagrammatically illustrates an RFID software stack 1500 according to an exemplary implementation, where an example of RFID Software Requirements include the following:

Functional User-Interface Requirements a. UI for putting conveyor into commissioning mode
b. UIs for alert-notification for when conveyor goes into "missing shoe identification and recovery" mode
c. UI for switching conveyor from "missing shoe and recovery" mode to "replacement-tag programming" mode
d. UI for switching conveyor from replacement-tag programming mode to "regular operation" mode
e. UI layer for RFID-system remote-access troubleshooting
   i. Reader 'On Line" verification
   ii. Reader Reboot
   iii. Reader Settings pushout (manual step)
   iv. Antenna-Port verification
   v. Firmware Upgrade capability
   vi. Settings Check (Selected Settings)
f. UI layer for RFID-system on-site operations
   i. See items a through d above 2) Infrastructure and Engine-Logic Requirements:

g. Static Database to store system-setup and configuration information (Tag identification association, etc.)
h. Dynamic Database for tag-read recording
i. System Setup Engine—To sequentially encode tags, log those tags into the static database, and maintain the knowledge of how (in which order) those tags are physically lined up on the conveyor
j. 'Missing Tag' Recovery Mode—Logic to conclude that a tag (shoe) is missing from having passed through two read points without being detected, to automatically put the conveyor into slowdown mode (⅕ speed) as a result of a tag being deemed as missing, and finally, to send alerts
k. Reprogramming/Tag-Replacement Mode—Logic to identify which tag needs to be programmed (by identifying the tag in front of it, and/or by recognizing the EPC as having an E200 prefix), logic to automatically program the replacement tag with the same EPC as its' predecessor tag—but with one added bit at the end for "replacement v. original" tag identification l. Cycle Counts—The ability to count the number of times a shoe-tag travels through the conveyor checkpoints m. Logic for conveyor-section identification through tag-ID association n. Software Layer for remote-access troubleshooting (refer to bullet-point "e" in "functional user-interface requirements" section, above)

o. Software Layer for on-site system operations (see bullet-points a through d in "functional user-interface requirements" section, above)

An exemplary implementation of RFID Tag Selection, Tag Placement and Tag Encoding are describes as follows:

Tag Selection: Any RFID tag can be implemented according to the disclosure. For example, a tag selected for this application can be a conventional RFID tag such as ALN-9830 manufactured by Alien Technology LLC . This tag measuring 70 mm×9.5 mm can fit within the molded shoe. The shape and orientation of the inlay can facilitate rapid, close proximity reading. However, other RFID design may also be used based on desired implementation and testing.

Figure 16:
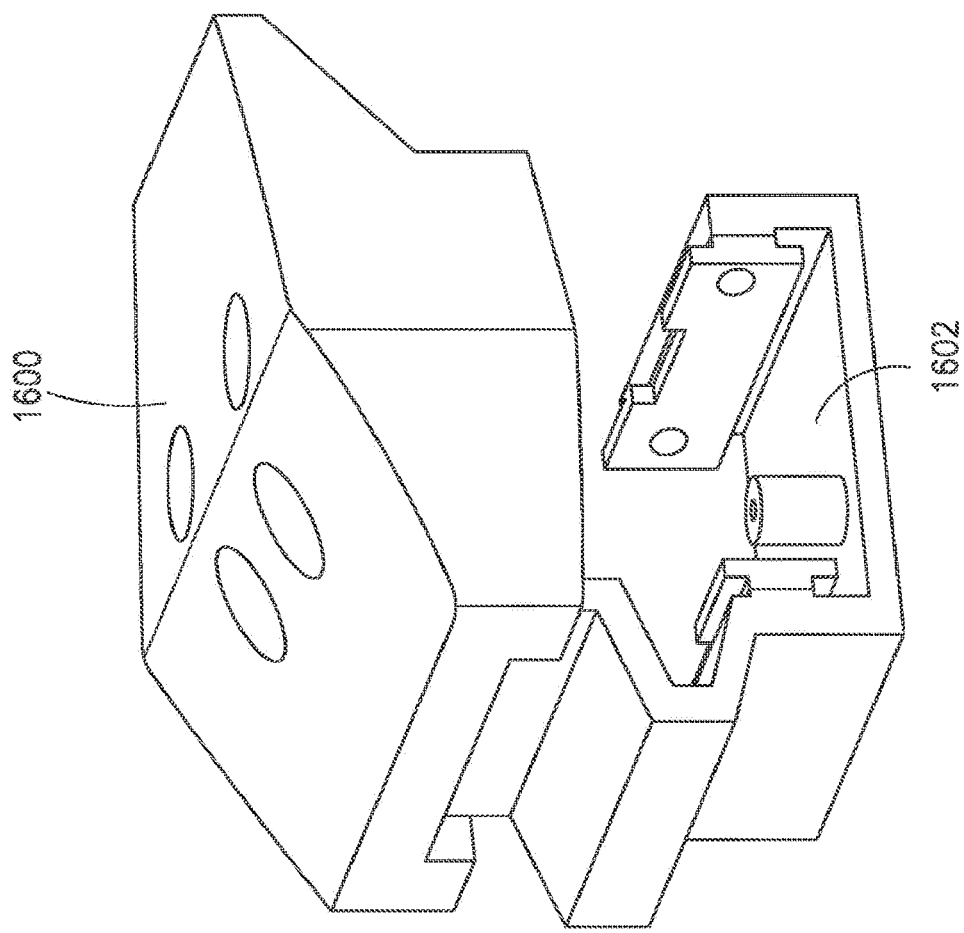
FIG. 16 illustrates another example of a conveyor shoe according to embodiments of present disclosure.

Tag Placement: as described in the examples of FIGS. 1 and 2 above, and further illustrated in FIG. 16, a tag can be inserted into the shoe 1600 during the injection molding process. It can be oriented such that the tag is parallel to the conveyor slat 1602.

Tag Encoding: As the RFID system can be encoded using a full 96 bit EPC bank in any manner. In an exemplary implementation, one of the bits can be used to identify that a shoe is a replacement shoe, in order for the system to know to start a new count of cycles for that shoe.

Figure 17:
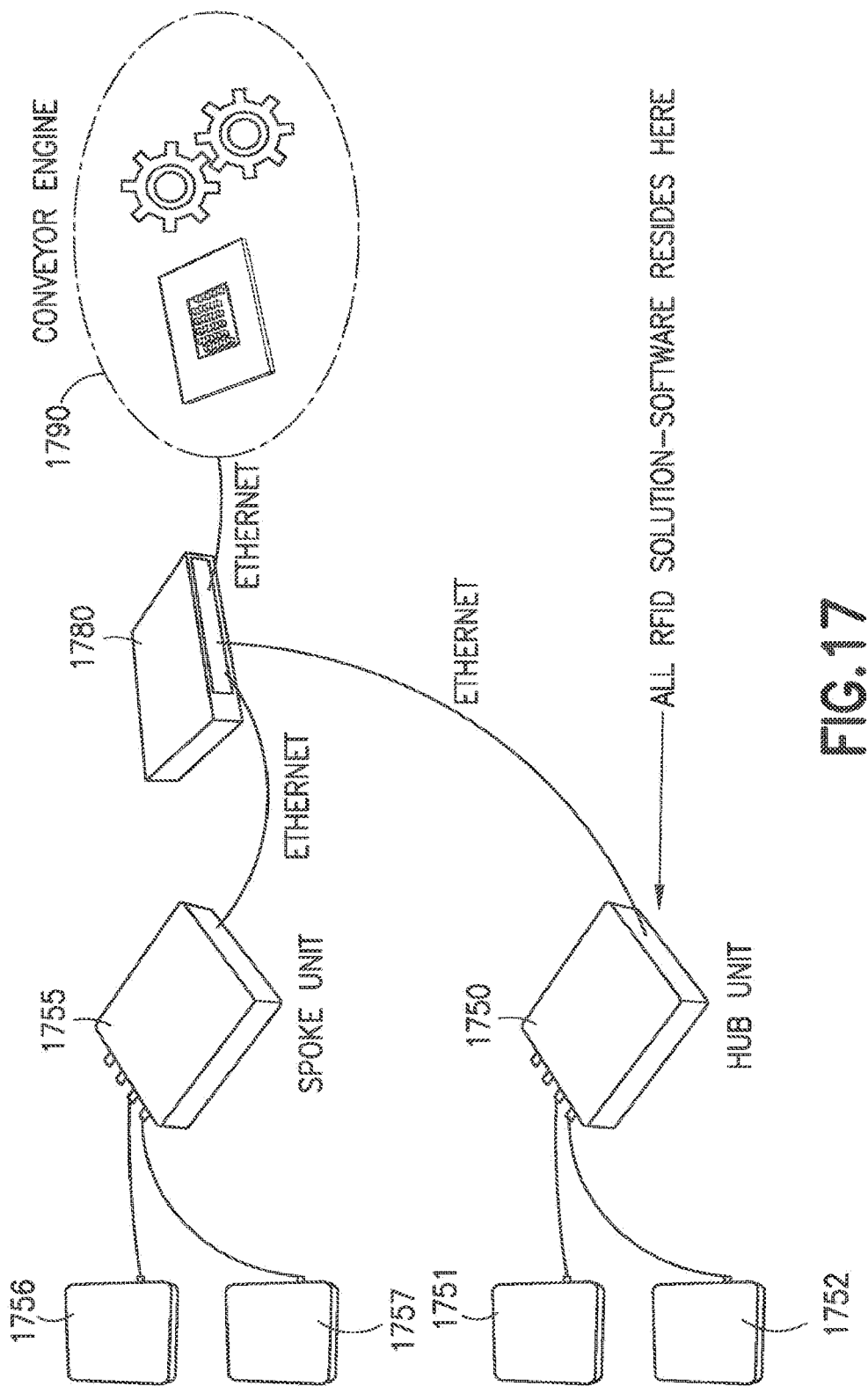
FIG. 17 is a diagrammatic illustration of an example of a configuration of hardware components of a system according to embodiments of present disclosure.
Figure 18:
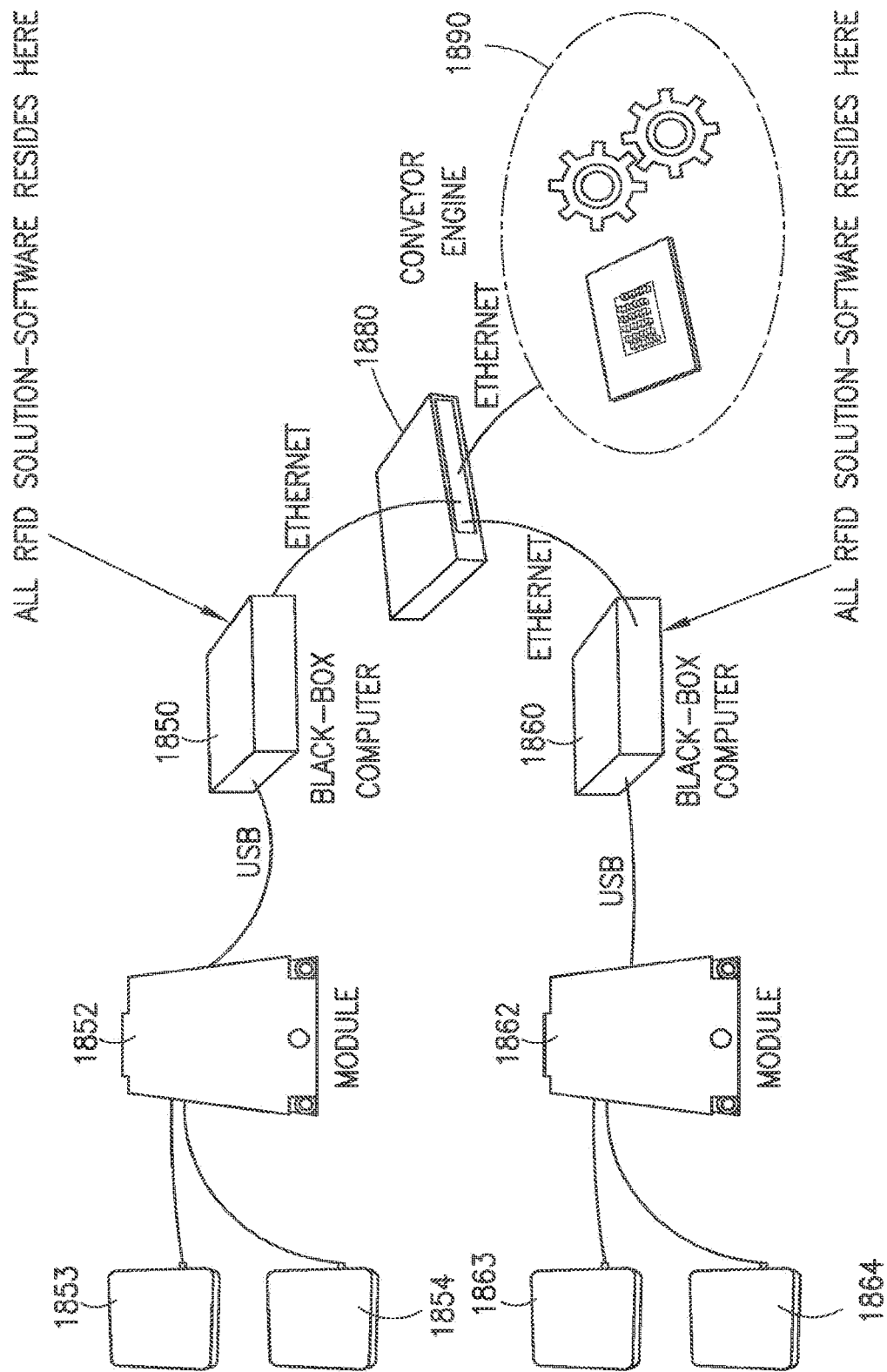
FIG. 18 is a diagrammatic illustration of another example of a configuration of hardware components of a system according to embodiments of present disclosure.
Figure 19:
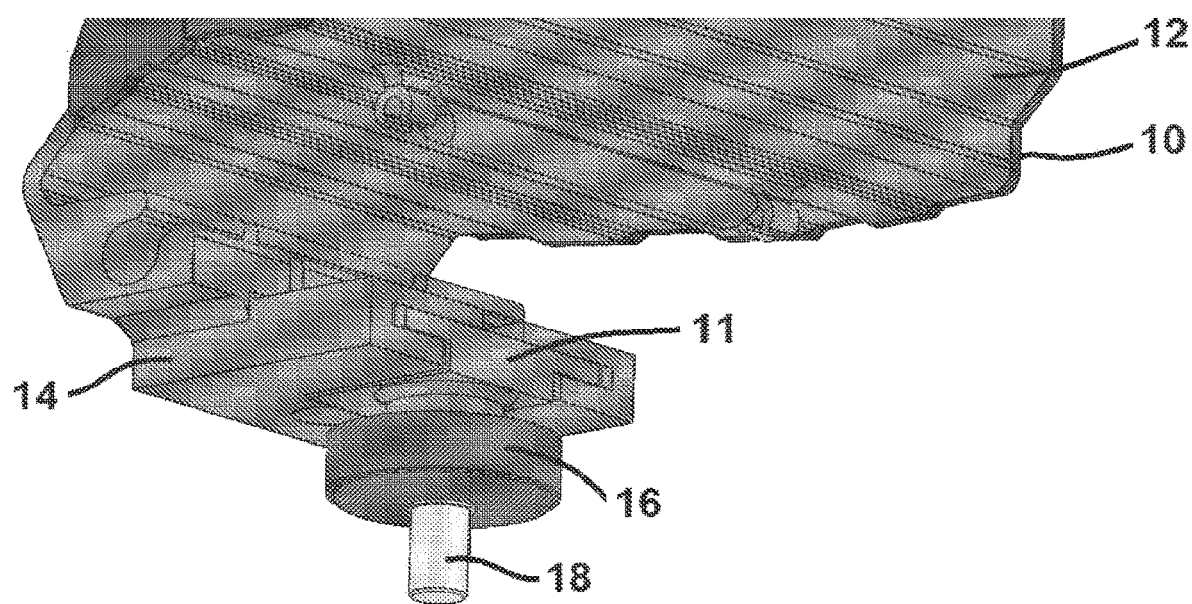
FIG. 19 illustrates an example of a conveyor shoe including a conventional pin component.

Referring to the examples of FIGS. 17 and 18, hardware design options implementing embodiments of the present disclosure using various hardware components, such as those manufactured by Alien Technology LLC.

An example of a fixed reader configuration is illustrated in FIG. 17 where an all RFID Solution-Software can reside in a hub unit 1750 and include:

Reader Firmware
Middleware
Databases (static and dynamic)
Event-Control Engine
Process-Logic Engine
Software-Layer for all local RFID operation
Software-Layer for all remote-access troubleshooting
User Interfaces In an exemplary implementation (see also FIG. 14) hub unit 1750 and spoke unit 1755 can include an RFID reader and be connected to respective antennas 1751, 1752 and 1756, 1757. Hub unit 1750 and spoke unit 1755 can be interconnected via an Ethernet component 1780 with conveyor engine 1790.

An example of a module configuration is illustrated in FIG. 18 where an all RFID Solution-Software can reside in one or more connected computing devices 1850, 1860 including a microprocessor and a non-transitory computer-readable storage medium including storage of computer-executable instructions, and can include:

Reader Firmware
Middleware
Databases (static and dynamic)
Event-Control Engine
Process-Logic Engine
Software-Layer for all local RFID operation
Software-Layer for all remote-access troubleshooting
User Interfaces In an exemplary implementation (see also FIGS. 14 and 17) computing devices 1850 can be connected in a wired or wireless configuration with respective modules 1852, 1862 that can include an RFID reader and be connected to respective antennas 1853, 1854 and 1863, 1864. Modules 1852, 1862 can be interconnected via an Ethernet component 1880 with conveyor engine 1990.

A further exemplary implementations of the embodiment of the present disclosure provide for reader data collection where a user device in communication with the reader, or the reader itself can store, for example in a file format, a list of all the valid RFIDs values for the sorter, such that upon startup, the file can be read, and for example if a file is not found or cannot be read, an error will be reported. In yet further exemplary implementation, every command received by the PLC can be stored, for example in a file/folder format by date, such that for example on a rolling basis, a particular period (e.g., 1 month) or records can be store and made available. In still further exemplary implementation items recorded can include without limitation any of:

Power On Events
Command Events
Record the detection of missing shoes
Maintenance Mode usage and/or shoe data can include for each shoe (for example at a minimum):

Number of revolutions since each particular shoe was 'read' by the scanner
Time Stamp for the last time a shoe was 'read'.

According to further exemplary implementations of the embodiment of the present disclosure the following non-limiting interface examples include:

PLC to Reader

| INT[X] | Definition |
|---|---|
| 1 | Heartbeat. Value incrementing every second will increment from 1 to 1000 |
| 2 | Speed of Sorter in FPM. |
| 3 | Command<br>1 = Present Shoe<br>2 = Setup Mode<br>3 = Broken Shoe<br>4 = Regular Run<br>5 = Request Data |
| 4 | Shoe Number to Present/Request Data |
| 5 | Number Of Shoes On Sorter |

Reader to PLC

| INT[X] | Definition |
|---|---|
| 1 | Heartbeat. Value incrementing every second will increment from 1 to 1000 |
| 2 | Last Shoe Read |
| 3 | Status:<br>1 = Presenting Shoe<br>2 = In Setup Mode<br>3 = Broken Shoe Detected |

-continued

| INT[X] | Definition |
|---|---|
|  | 4 = In Regular Run |
|  | 5 = Requested Data |
| 4 | ID of First Broken Shoes |
| 5 | Number Of Broken Shoes |
| 6 | Request Shoe |
| 7 | Requested Shoe OK |
| 8 | Requested Shoe Read Counts |
| 9 | Last Seen |
|  | 1 = Right Side |
|  | 2 = Left Side |
| 10 | Last Seen |
|  | 1 = induct |
|  | 2 = discharge |

Upon detection of a missing/malfunctioning shoe and/or pin, a sorter slat on which the show rides may need to be removed from the sorter, in order to install a new shoe and/or pin on the slat, and then re-installed on the sorter.

Referring now to FIGS. 22-27, non-limiting exemplary implementation of exemplary embodiments of the present disclosure provide a system and method for removal and installation of sorter slats, where sorter 4000 comprises a slat guide 4002 including hubs 4008 connected thereto, each hub 4008 having wheel 4004 mounted thereon, and an assembly 4006 including a latching mechanism 4010 for removably attaching slat 3030 to sorter 4000.

In an exemplary implementation, each hub 4008 has a slat 3030 associated therewith such that latching mechanism 4010 removably latches slat 3030 to sorter 4000 at hub 4008 associated with the respective slat 3030.

In an exemplary implementation, latching mechanism 4040, which can be implemented for example as a cam, comprises a latch 4012 selectively manipulated by a controller 4014 to engage A or release B (see example of annotated FIG. 24) hub 4008 thereby selectively allowing installation or removal accordingly of slat 3030 with respect to associated hub 4008. Optionally, hub 4008 can include a sleeve 4018 to facilitate engagement and/or release/disengagement of latch 4012 from hub 4008. Optionally, assembly 4006 can include a cover 4019 for covering latching mechanism 4040 such that only certain portions, particularly of controller 4014, remain exposed to allow external interface with the latching mechanism to engage A and/or release B slat 3030 from hub 4008.

In an exemplary implementation, latching mechanism 4040 optionally comprises a combination of components including a hook 4020 for selectively engaging hub 4008. Hook 4020 can be optionally mounted on a pivot 4022 and/or optionally biased, for example in a disengage or release B position, by a spring 4024. Hook 4020 can optionally include a lever 4026 in communication with controller 4014 selectively causing hook 4020 to pivot between engage A and/or release B positions. In an exemplary implementation latch 4012 comprises hook 2020, pivot 4022, spring 4024, and lever 2020.

In an exemplary implementation, latching mechanism 4040 optionally comprises a combination of components including a shaft 4030 for selectively interfacing with latch 4012 causing latch 4012 to selectively engage A and/or disengage B hub 4008. For example, axial displacement of the shaft 4030 acts on latch 4012 to cause latch 4012 to selectively engage A and/or disengage B hub 4008. In another exemplary implementation, shaft 4030 comprise a head portion 4032 and rod portion 4034 such that shaft 4030 can be rotated by head portion 4032, which may optionally include an external interface, such as for example a slot 4038 accessible by a for example a screw driver, to advance or retract rod portion 4034 with respect to latch 4012 to cause latch 4012 to selectively engage A and/or disengage B hub 4008.

In yet another exemplary implementation, shaft 4030 can be optionally biased, for example by a spring 4036 in a retracted position such that latch 4012 remains in a release or disengage B position. In yet further exemplary implementation, rotational movement of shaft 4030 with respect to assembly 4006 causes axial movement of shaft 4030 such that, a turn (for example a ¼ turn) of head portion 4032 in one direction causes rod portion 4032 to advance axially causing latch 4012 to engage A hub 4008, and a turn (for example a ¼ turn) of head portion 4032 in an opposite direction causes rod portion 4032 to retract axially causing latch 4012 to disengage B hub 4008. In still further exemplary implementation, when shaft 4030 is rotated with respect to assembly 4006 to cause latch 4012 to engage A hub 4008, shaft 4030 can be locked with respect to assembly 4006, for example to prevent accidental disengagement of latch 4012 from hub 4008.

In an exemplary implementation controller 4014 comprises shaft 4030, including one or all of the features described above, and/or sprig 4036.

In an exemplary implementation, each slat 3030 of sorter 4000 comprises a shoe 3000 disposed thereon, such that shoe 3000 rides on slat 3030.

Figure 27:
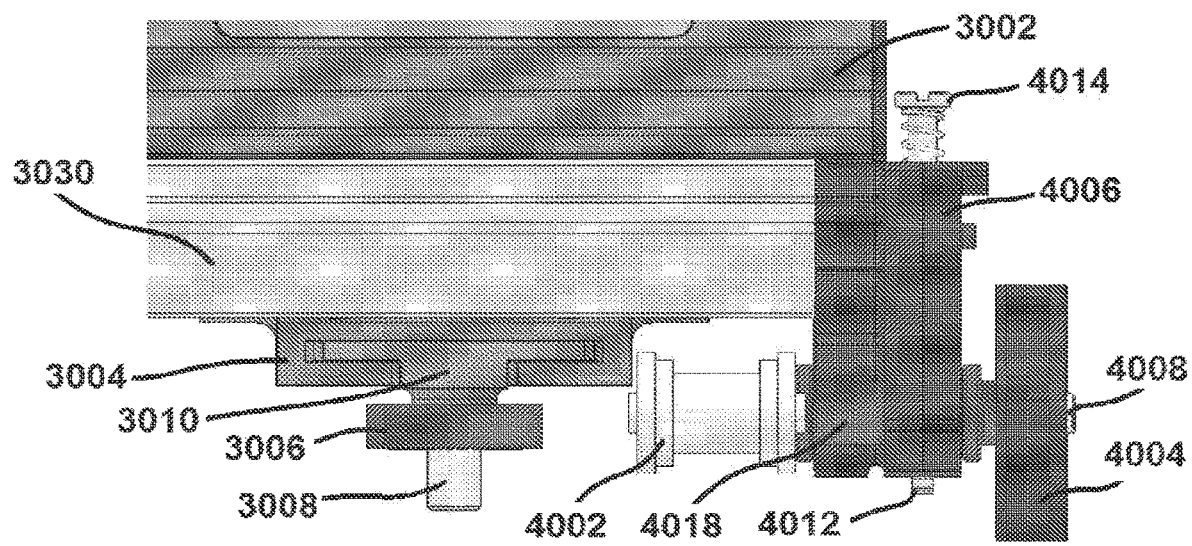
FIG. 27 illustrates an example of an exploded view of a show on a slat in a conveyor or sorter including a system and method for removal and installation of sorter slats according to exemplary embodiments of the present disclosure.

In an exemplary implementation, shoe 3000 disposed on a slat 3030 of sorter 4000 comprises a housing 3002 mounted to a slat interface 3004 and includes pin components, roller 106 and pin 108, which are connected to slat interface 3004 via a mounting bracket 3010 (see, for example, FIG. 27).

According to exemplary implementations of the present disclosure, shoe 3000 can be a conventional sorter shoe, or a shoe comprising "smart shoe" and/or "missing pin detection" technology including any and/or all of the features illustrated for example in FIGS. 1-21.

While a detailed implementation of system and method for slat installation and removal is described with reference to FIGS. 22-27, any means of selectively installing or removing a slat by manipulation of an external controller acting on a release mechanism is within the scope of the present disclosure.

While the present disclosure has been shown and described with reference to certain exemplary embodiments thereof, it will be understood by those skilled in the art that various changes in form and details may be made therein without departing from the spirit and scope of the present disclosure. For example, various communication protocols can be deployed with various RFID tag and RFID reader hardware, and/or various visual and/or audio user interfaces can be implemented to facilitate processing and/or displaying information and/or controlling hardware and/or software components of the system.

In addition, the drawing figures that follow further describe non-limiting examples of implementations of certain exemplary embodiments of the present disclosure and aid in the description of technology associated therewith.

Thus, the description and figures are intended by way of example only and are not intended to limit the illustrative embodiments in any way except as set forth in the appended claims and their full scope of equivalents. Also, various technical aspects of the various elements of the various exemplary embodiments that have been described above can be combined in numerous other ways, all of which are considered to be within the scope of the disclosure.

I claim:

1. A method of attaching a slat to a conveyor system, the method comprising:

providing a slat assembly comprising: a slat, a latch, comprising a hook attached to the slat, and a controller comprising a shaft;

controlling a movement of the shaft in an axial direction thereof into an engaged position, thereby causing the shaft to press a portion of the hook, thus pivoting the hook and causing the hook to engage a hub of the conveyor system.

2. The method according to claim 1, wherein the controller further comprises a spring which biases the shaft in the axial direction away from the hook.

3. The method according to claim 1, further comprising:

rotating the shaft while pressing the hook therewith, thereby fixing the shaft in the engaged position.

4. The method according to claim 3, wherein the shaft comprises a head with a slot formed therein.

5. A method of removing a slat from a conveyor system, the method comprising:

providing a slat assembly comprising: a slat, a latch, comprising a hook attached to the slat, and a controller comprising a shaft and a spring, wherein the latch is in an engaged position engaged with a hub of the conveyor system;

rotating a head of the shaft, thereby releasing the shaft from compressing the spring;

the spring pressing the shaft away from the hook, thereby causing the hook to pivot and disengage from the hub of the conveyor system.

6. The method according to claim 5, wherein the shaft comprises a head with a slot formed therein.

* * * * *